(12) United States Patent
Hurd et al.

(10) Patent No.: US 12,550,974 B2
(45) Date of Patent: Feb. 17, 2026

(54) CUSHIONING MEMBER FOR ARTICLE OF FOOTWEAR AND METHOD OF MAKING

(71) Applicant: NIKE, Inc., Beaverton, OR (US)

(72) Inventors: John Hurd, Lake Oswego, OR (US); Tetsuya T. Minami, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 1 day.

(21) Appl. No.: 18/353,856

(22) Filed: Jul. 17, 2023

(65) Prior Publication Data

US 2023/0354958 A1    Nov. 9, 2023

Related U.S. Application Data

(63) Continuation of application No. 16/933,687, filed on Jul. 20, 2020, now Pat. No. 11,744,321.

(Continued)

(51) Int. Cl.
| | |
|---|---|
| *A43B 13/14* | (2006.01) |
| *A43B 1/00* | (2006.01) |
| *A43B 13/04* | (2006.01) |
| *A43B 13/12* | (2006.01) |
| *A43B 13/18* | (2006.01) |

(52) U.S. Cl.
CPC .......... *A43B 13/146* (2013.01); *A43B 1/0072* (2013.01); *A43B 13/04* (2013.01); *A43B 13/125* (2013.01); *A43B 13/181* (2013.01); *A43B 13/12* (2013.01); *A43B 13/187* (2013.01)

(58) Field of Classification Search
None
See application file for complete search history.

(56) References Cited

U.S. PATENT DOCUMENTS

| | | |
|---|---|---|
| 2,930,149 A | 3/1960 | Hack |
| 3,087,262 A | 4/1963 | Russell |

(Continued)

FOREIGN PATENT DOCUMENTS

| | | |
|---|---|---|
| CH | 283034 A | 5/1952 |
| CN | 1053884 A | 8/1991 |

(Continued)

OTHER PUBLICATIONS

European Patent Office as the International Searching Authority, International Search Report and Written Opinion for PCT Application No. PCT/US2016/053256, mailed Jan. 12, 2017.

(Continued)

*Primary Examiner* — Haley A Smith
(74) *Attorney, Agent, or Firm* — Honigman LLP; Matthew H. Szalach; Jonathan P. O'Brien

(57) ABSTRACT

A method of making a cushioning member is provided. The method includes forming a first barrier member from a first material, the first barrier member including a first compartment and a second compartment. The method further includes forming a second barrier member from a second material different than the first material. The first compartment is provided with a first quantity of particulate matter and the second compartment is provided with a second quantity of particulate matter. The method further includes covering the first compartment with the second barrier member and covering the second compartment with the second barrier member.

20 Claims, 19 Drawing Sheets

Related U.S. Application Data

(60) Provisional application No. 62/923,661, filed on Oct. 21, 2019, provisional application No. 62/878,706, filed on Jul. 25, 2019.

(56) References Cited

U.S. PATENT DOCUMENTS

| | | | |
|---|---|---|---|
| 3,469,576 A | | 9/1969 | Smith |
| 3,552,044 A | | 1/1971 | Wiele |
| 3,608,215 A | | 9/1971 | Fukuoka |
| 3,724,106 A | | 4/1973 | Magidson |
| 3,765,422 A | | 10/1973 | Smith |
| 3,906,570 A | | 9/1975 | Revill |
| 3,971,839 A | | 7/1976 | Taylor |
| 4,129,951 A | * | 12/1978 | Petrosky ............ A43B 13/203 36/29 |
| 4,170,078 A | | 10/1979 | Moss |
| 4,307,200 A | | 12/1981 | Lichter et al. |
| 4,342,157 A | * | 8/1982 | Gilbert ................ A43B 13/20 36/35 B |
| 4,343,047 A | | 8/1982 | Lazowski et al. |
| 4,345,387 A | | 8/1982 | Daswick |
| 4,472,890 A | * | 9/1984 | Gilbert ................ A43B 13/20 36/35 B |
| 4,524,529 A | | 6/1985 | Schaefer |
| 4,658,515 A | * | 4/1987 | Oatman ................ A43B 17/14 36/31 |
| 4,686,781 A | | 8/1987 | Bury |
| 4,724,627 A | | 2/1988 | Sisco |
| 4,823,799 A | | 4/1989 | Robbins |
| 4,905,320 A | | 3/1990 | Squyers, Jr. |
| 4,970,807 A | | 11/1990 | Anderie et al. |
| 5,005,575 A | | 4/1991 | Geri |
| 5,150,490 A | | 9/1992 | Busch et al. |
| 5,220,737 A | * | 6/1993 | Edington ............ A43B 13/20 36/35 B |
| 5,231,776 A | | 8/1993 | Wagner |
| 5,363,570 A | | 11/1994 | Allen et al. |
| 5,378,223 A | | 1/1995 | Grim et al. |
| 5,383,290 A | | 1/1995 | Grim |
| 5,392,534 A | | 2/1995 | Grim |
| 5,517,770 A | | 5/1996 | Martin et al. |
| 5,617,650 A | | 4/1997 | Grim |
| 5,665,285 A | | 9/1997 | Hattori et al. |
| 5,718,064 A | | 2/1998 | Pyle |
| 5,753,357 A | | 5/1998 | Filipitsch et al. |
| 5,758,435 A | | 6/1998 | Miyata |
| 5,890,248 A | | 4/1999 | Gee |
| 5,920,915 A | | 7/1999 | Bainbridge et al. |
| 5,987,781 A | | 11/1999 | Pavesi et al. |
| 6,020,055 A | | 2/2000 | Pearce |
| 6,032,300 A | | 3/2000 | Bainbridge et al. |
| 6,061,928 A | * | 5/2000 | Nichols ................ A43B 13/181 36/28 |
| 6,098,209 A | | 8/2000 | Bainbridge et al. |
| 6,158,149 A | | 12/2000 | Rudy |
| 6,266,896 B1 | | 7/2001 | Liu |
| D460,852 S | | 7/2002 | Daudier |
| 6,453,477 B1 | | 9/2002 | Bainbridge et al. |
| 6,502,331 B2 | | 1/2003 | Hines |
| 6,532,689 B1 | | 3/2003 | Jones, Jr. |
| 6,635,203 B2 | | 10/2003 | Monaci |
| 6,759,443 B2 | | 7/2004 | Brant et al. |
| 6,782,640 B2 | | 8/2004 | Westin |
| 6,848,200 B1 | | 2/2005 | Westin |
| 6,878,753 B1 | | 4/2005 | Takemura et al. |
| 7,037,571 B2 | | 5/2006 | Fish et al. |
| 7,069,672 B2 | | 7/2006 | Hahn |
| 7,152,342 B2 | | 12/2006 | Sommer |
| 7,448,150 B1 | * | 11/2008 | Davis ................ A43B 13/203 36/35 B |
| 7,484,318 B2 | | 2/2009 | Finkelstein |
| 7,555,851 B2 | | 7/2009 | Hazenberg et al. |
| 7,594,344 B2 | | 9/2009 | Mizrahi |
| 7,805,859 B2 | | 10/2010 | Finkelstein |
| 7,823,238 B2 | | 11/2010 | Din Mahamed |
| 7,841,108 B2 | | 11/2010 | Johnson et al. |
| 7,904,971 B2 | | 3/2011 | Doria et al. |
| 8,091,254 B2 | | 1/2012 | Wang |
| 8,178,022 B2 | | 5/2012 | Schindler et al. |
| 8,272,149 B2 | | 9/2012 | Cooper et al. |
| 8,671,591 B2 | | 3/2014 | Brown |
| 8,713,817 B2 | | 5/2014 | Litchfield et al. |
| 9,737,111 B2 | | 8/2017 | Lustik |
| 2001/0000835 A1 | | 5/2001 | Hines |
| 2001/0042321 A1 | | 11/2001 | Tawney et al. |
| 2003/0046831 A1 | | 3/2003 | Westin |
| 2003/0217484 A1 | | 11/2003 | Christensen et al. |
| 2005/0022424 A1 | | 2/2005 | Held |
| 2005/0086728 A1 | | 4/2005 | Tobergte |
| 2005/0150132 A1 | | 7/2005 | Iannacone |
| 2006/0010717 A1 | * | 1/2006 | Finkelstein .......... A43B 13/187 36/43 |
| 2006/0026863 A1 | | 2/2006 | Liu |
| 2006/0130363 A1 | * | 6/2006 | Hottinger ............ A43B 13/187 36/11.5 |
| 2006/0206977 A1 | | 9/2006 | Hammons et al. |
| 2007/0051018 A1 | | 3/2007 | Issler |
| 2007/0169379 A1 | | 7/2007 | Hazenberg et al. |
| 2008/0066341 A1 | | 3/2008 | Hottinger |
| 2008/0148599 A1 | | 6/2008 | Collins |
| 2008/0230956 A1 | | 9/2008 | Allmendinger et al. |
| 2009/0094855 A1 | | 4/2009 | Finkelstein |
| 2009/0313853 A1 | | 12/2009 | Tadin |
| 2010/0011618 A1 | | 1/2010 | Bitton |
| 2010/0047550 A1 | | 2/2010 | Prissok et al. |
| 2010/0154252 A1 | | 6/2010 | Avent et al. |
| 2010/0222442 A1 | | 9/2010 | Prissok et al. |
| 2010/0251565 A1 | * | 10/2010 | Litchfield ............ A43B 13/145 36/35 B |
| 2011/0016747 A1 | | 1/2011 | Bitton |
| 2011/0215497 A1 | | 9/2011 | McEvoy et al. |
| 2012/0023776 A1 | | 2/2012 | Skaja et al. |
| 2012/0036698 A1 | | 2/2012 | Guertin |
| 2012/0073163 A1 | | 3/2012 | Tse |
| 2012/0204451 A1 | | 8/2012 | De Roode et al. |
| 2012/0210602 A1 | | 8/2012 | Brown |
| 2013/0008050 A1 | | 1/2013 | Marc |
| 2013/0145653 A1 | | 6/2013 | Bradford |
| 2013/0247422 A1 | | 9/2013 | Holt |
| 2014/0007456 A1 | | 1/2014 | Tadin |
| 2014/0151918 A1 | | 6/2014 | Hartmann |
| 2014/0223776 A1 | | 8/2014 | Wardlaw et al. |
| 2014/0223777 A1 | | 8/2014 | Whiteman et al. |
| 2014/0283413 A1 | | 9/2014 | Christensen et al. |
| 2015/0196085 A1 | | 7/2015 | Westmoreland et al. |
| 2015/0223564 A1 | | 8/2015 | Peyton et al. |
| 2015/0257481 A1 | | 9/2015 | Campos, II |
| 2015/0264999 A1 | | 9/2015 | Marshall et al. |
| 2016/0010717 A1 | | 1/2016 | Tosovsky |
| 2016/0073732 A1 | | 3/2016 | Ernst et al. |
| 2016/0157554 A1 | | 6/2016 | Adams |
| 2016/0278481 A1 | | 9/2016 | Le et al. |
| 2017/0055636 A1 | | 3/2017 | Campos, II et al. |
| 2018/0077997 A1 | * | 3/2018 | Hoffer ................ A43B 13/189 |
| 2018/0132564 A1 | | 5/2018 | Bruce et al. |
| 2018/0228248 A1 | | 8/2018 | Hazenberg et al. |
| 2018/0352900 A1 | * | 12/2018 | Hartmann ............ A43B 13/04 |
| 2019/0261737 A1 | * | 8/2019 | Walsh .................. A43B 13/18 |
| 2019/0343225 A1 | * | 11/2019 | Reddy ................ A43B 13/125 |
| 2019/0380424 A1 | | 12/2019 | Tamm et al. |

FOREIGN PATENT DOCUMENTS

| | | |
|---|---|---|
| CN | 1211901 A | 3/1999 |
| CN | 2620493 Y | 6/2004 |
| CN | 1638663 A | 7/2005 |
| CN | 2888936 Y | 4/2007 |
| CN | 202051034 U | 11/2011 |
| CN | 202145956 U | 2/2012 |
| CN | 102481031 A | 5/2012 |
| CN | 103141993 A | 6/2013 |
| CN | 103720129 A | 4/2014 |
| CN | 103747700 A | 4/2014 |

(56) References Cited

FOREIGN PATENT DOCUMENTS

| | | |
|---|---|---|
| CN | 104010541 A | 8/2014 |
| CN | 104203029 A | 12/2014 |
| CN | 104363783 A | 2/2015 |
| CN | 104490008 A | 4/2015 |
| CN | 109952042 A | 6/2019 |
| DE | 2907506 A1 | 9/1980 |
| DE | 3406504 A1 | 8/1985 |
| DE | 3627538 A1 | 2/1988 |
| DE | 3723549 A1 | 2/1988 |
| DE | 3406504 C2 | 1/1990 |
| DE | 3839747 A1 | 5/1990 |
| DE | 3905989 C2 | 1/1991 |
| DE | 4202159 A1 | 7/1993 |
| DE | 4401282 A1 | 12/1994 |
| DE | 4446252 A1 | 6/1995 |
| DE | 19708622 A1 | 9/1997 |
| DE | 19938609 A1 | 3/2001 |
| DE | 10138426 C1 | 12/2002 |
| DE | 102009009589 A1 | 9/2010 |
| DE | 102010046278 A1 | 2/2011 |
| DE | 202016104626 U1 | 10/2016 |
| EP | 0007948 A1 | 2/1980 |
| EP | 130816 A2 | 1/1985 |
| EP | 316289 A2 | 5/1989 |
| EP | 0359699 A1 | 3/1990 |
| EP | 0383685 A1 | 8/1990 |
| EP | 529941 A1 | 3/1993 |
| EP | 2609824 A1 | 7/2013 |
| EP | 2649896 B1 | 10/2016 |
| EP | 3386334 A1 | 10/2018 |
| EP | 4268662 A2 | 11/2023 |
| FR | 996111 A | 12/1951 |
| FR | 1018215 A | 12/1952 |
| FR | 2642941 A1 | 8/1990 |
| FR | 2824884 A1 | 11/2002 |
| GB | 1301147 A | 12/1972 |
| GB | 2066049 A | 7/1981 |
| GB | 2462100 A | 1/2010 |
| JP | S56-080702 U | 6/1981 |
| JP | H02-121601 A | 5/1990 |
| JP | H02252401 A | 10/1990 |
| JP | H0723804 A | 1/1995 |
| JP | H0739404 A | 2/1995 |
| JP | H11-32806 A | 2/1999 |
| JP | 2000316606 A | 11/2000 |
| JP | 2002306280 A | 10/2002 |
| JP | 2008533327 A | 8/2008 |
| JP | 2009056007 A | 3/2009 |
| JP | 2014033742 A | 2/2014 |
| JP | 2015513354 A | 5/2015 |
| JP | 2016182332 A | 10/2016 |
| KR | 19990069793 A | 9/1999 |
| KR | 100230096 B1 | 11/1999 |
| KR | 200374026 Y1 | 1/2005 |
| KR | 20100086227 A | 7/2010 |
| KR | 20120033710 A | 4/2012 |
| TW | 385636 U | 3/2000 |
| WO | WO-1997035496 A1 | 10/1997 |
| WO | WO-9947014 A1 | 9/1999 |
| WO | WO-2006049401 A1 | 5/2006 |
| WO | WO-2008012809 A2 | 1/2008 |
| WO | WO-2012177957 A2 | 12/2012 |
| WO | WO-2013013784 A1 | 1/2013 |
| WO | WO-2014126799 A1 | 8/2014 |
| WO | WO-2015065578 A1 | 5/2015 |
| WO | WO-2018169535 A1 | 9/2018 |
| WO | WO-2018175734 A1 | 9/2018 |
| WO | WO-2020125963 A1 | 6/2020 |

OTHER PUBLICATIONS

European Patent Office as the International Searching Authority, International Search Report and Written Opinion for PCT Application No. PCT/US2016/053240, mailed Jan. 3, 2017.
European Patent Office as the International Searching Authority, International Search Report and Written Opinion for PCT Application No. PCT/US2016/053260, mailed Dec. 15, 2016.
European Patent Office as the International Searching Authority, International Search Report and Written Opinion for PCT Application No. PCT/US2016/053232, mailed Jan. 10, 2017.
European Patent Office as the International Searching Authority, International Search Report and Written Opinion for PCT Application No. PCT/US2016/053246, mailed Jan. 10, 2017.
European Patent Office as the International Searching Authority, International Search Report and Written Opinion for PCT Application No. PCT/US2016/053265, mailed Dec. 20, 2016.
United States Patent and Trademark Office, Office Action for U.S. Appl. No. 15/816,270, mailed Apr. 17, 2018.
United States Patent and Trademark Office, Office Action for U.S. Appl. No. 15/816,200, mailed Apr. 18, 2018.
Korean Intellectual Property Office, Office Action for Application No. 10-2018-7011476, mailed May 29, 2019.
Korean Intellectual Property Office, Office Action for Application No. 10-2018-7011477, mailed May 29, 2019.
Korean Intellectual Property Office, Office Action for Application No. 10-2018-7011479, mailed Jun. 4, 2019.
Korean Intellectual Property Office, Office Action for Application No. 10-2018-7011480, mailed Jun. 10, 2019.
Korean Intellectual Property Office, Office Action for Application No. 10-2018-7011478, mailed Jun. 4, 2019.
Japan Patent Office, Notice of Reasons for Rejection for JP Application No. 2018-515812 mailed Jul. 29, 2019.
Japan Patent Office, Notice of Reasons for Rejection for JP Application No. 2018-515822 mailed Jul. 22, 2019.
Japan Patent Office, Notice of Reasons for Rejection for JP Application No. 2018-515842 mailed Aug. 5, 2019.
Japan Patent Office, Notice of Reasons for Rejection for JP Application No. 2018-515825 mailed Jul. 22, 2019.
Japan Patent Office, Notice of Reasons for Rejection for JP Application No. 2018-515843 mailed Aug. 5, 2019.
Japan Patent Office, Notice of Reasons for Rejection for JP Application No. 2018-515828 mailed Jul. 22, 2019.
Taiwan Intellectual Property Office, Search Report for TW Application No. 105130844 mailed Aug. 28, 2019.
European Patent Office (Isa), International Search Report and Written Opinion for PCT Application No. PCT/US2017/022651, mailed Oct. 25, 2017.
European Patent Office (Isa), International Search Report and Written Opinion for PCT Application No. PCT/US2017/022647, mailed Nov. 2, 2017.
European Patent Office (Isa), International Preliminary Report on Patentability for International Application No. PCT/US2017/022651, mailed Sep. 26, 2019.
European Patent Office (Isa), International Preliminary Report on Patentability for International Application No. PCT/US2017/022647, mailed Sep. 26, 2019.
United States Patent and Trademark Office, Office Action for U.S. Appl. No. 15/574,700, mailed Oct. 22, 2019.
Korean Intellectual Property Office, Office Action for KR Application No. 10-2018-7011479, mailed Dec. 26, 2019.
Korean Intellectual Property Office, Office Action for KR Application No. 10-2018-7011480, mailed Jan. 21, 2020.
European Patent Office, Extended European Search Report for EP Application No. 19196682.9, mailed Jan. 2, 2020.
China National Intellectual Property Office, Office Action for CN Application No. 201680062271.7, mailed Feb. 3, 2020.
Korean Intellectual Property Office, Office Action for KR Application No. 10-2019-7036063, mailed Feb. 7, 2020.
China National Intellectual Property Office, Office Action for CN Application No. 201680066156.7, mailed Jan. 22, 2020.
China National Intellectual Property Office, Office Action and Search Report for CN Application No. 201680062323.0, mailed Mar. 4, 2020.
China National Intellectual Property Office, Office Action and Search Report for CN Application No. 201680062231.2, mailed Mar. 24, 2020.

(56) References Cited

OTHER PUBLICATIONS

China National Intellectual Property Office, Office Action for CN Application No. 201680066534.1, mailed Mar. 26, 2020.
China National Intellectual Property Office, Office Action and Search Report for CN Application No. 201680062300.X, mailed Mar. 12, 2020.
European Patent Office, Communication pursuant to Article 94(3) EPC for EP Application No. 16777864.6, mailed Apr. 7, 2020.
European Patent Office, Communication pursuant to Article 94(3) EPC for EP Application No. 16777865.3, mailed Apr. 20, 2020.
Korean Intellectual Property Office, Office Action for KR Application No. 10-2020-7003423, mailed Apr. 21, 2020.
European Patent Office, Communication pursuant to Article 94(3) EPC for EP Application No. 16777863.8, mailed Apr. 15, 2020.
Japan Patent Office, Decision of Rejection for JP Application No. 2018-515812, mailed Apr. 6, 2020.
European Patent Office, Extended European Search Report for EP Application No. 19212921.1, mailed Mar. 31, 2020.
European Patent Office (ISA), International Search Report and Written Opinion for PCT Application No. PCT/US2020/042784, mailed Sep. 17, 2020.
Ge, Chengbiao et al., Steam-chest molding of expanded thermoplastic polyurethane bead foams and their mechanical properties, Chemical Engineering Science 174 (2017) pp. 337-346.
Japan Patent Office, Notification of Reasons for Refusal for JP Application No. 2019-550843, mailed Nov. 24, 2020.
European Patent Office, Communication pursuant to Article 94(3) EPC for EP Application No. 16777864.6, mailed Dec. 16, 2020.
European Patent Office, Communication pursuant to Article 94(3) EPC for EP Application No. 16777863.8, mailed Dec. 22, 2020.
KS65 Luxury Light Fescue—Field Green <http://www.kodiaksports.com/Artificial-Turf/Fake-Grass/Artificial-Grass-ST65_LFS_Field, Oct. 12, 2013, (Oct. 12, 2013), Retrieved from internet: URL:https://web.archive.org/web/*/http://www.kodiaksports.com/core/media/media.nl/id.28351/c.1268496/.f?h=1c04c87e9fd3f9d67f24 [retrieved on Dec. 15, 2016].
European Patent Office as the International Searching Authority, International Search Report and Written Opinion for PCT Application No. PCT/US2020/042735, mailed Sep. 16, 2020.
European Patent Office as the International Searching Authority, International Search Report and Written Opinion for PCT Application No. PCT/US2020/042784, mailed Sep. 17, 2020.
European Patent Office as the International Searching Authority, International Search Report and Written Opinion for PCT Application No. PCT/US2020/042807, mailed Sep. 16, 2020.
Taiwan Office Action for Application 109111247 dated Apr. 30, 2021.
Japan Patent Office, Notice of Reasons for Rejection for JP Application No. 2020-017002 mailed May 31, 2021.
Japan Patent Office, Notice of Reasons for Rejection for JP Application No. 2019-550853 mailed May 25, 2021.
Japanese Office Action for Application No. 2020-017000 dated May 31, 2021.
China National Intellectual Property Administration, Second Office Action for application No. 201780088457.4 dated Jul. 19, 2021.
Taiwan Intellectual Property Office, Office Action dated Sep. 3, 2021 for application No. 109125077.
Taiwan Intellectual Property Office, Office Action dated Jun. 3, 2021 for application No. 109125078.
Taiwan Intellectual Property Office, Office Action dated Jun. 3, 2021 for application No. 109125079.
China National Intellectual Property Administration, Decision of Rejection Office Action dated Jun. 29, 2021 for application No. 201680062323.0.
European Patent Office, Extended European Search Report for EP Application No. 22161547.9 mailed Jun. 3, 2022.
United States Patent and Trademark Office, Non-Final Office Action for U.S. Appl. No. 16/493,952 mailed Jul. 22, 2022.
USPTO, Non-Final Office Action for U.S. Appl. No. 16/493,994. mailed Oct. 6, 2022.
USPTO, Non-Final Office Action for U.S. Appl. No. 16/933,687, mailed Dec. 13, 2022.
USPTO, Final Office Action for U.S. Appl. No. 16/933,687, mailed May 10, 2022.
USPTO, Non-Final Office Action for U.S. Appl. No. 16/933,687, mailed Jan. 24, 2022.
European Patent Office, Communication pursuant to Article 94(3) EPC for EP App. No. 23196206.9, mailed Jul. 25, 2024.

\* cited by examiner

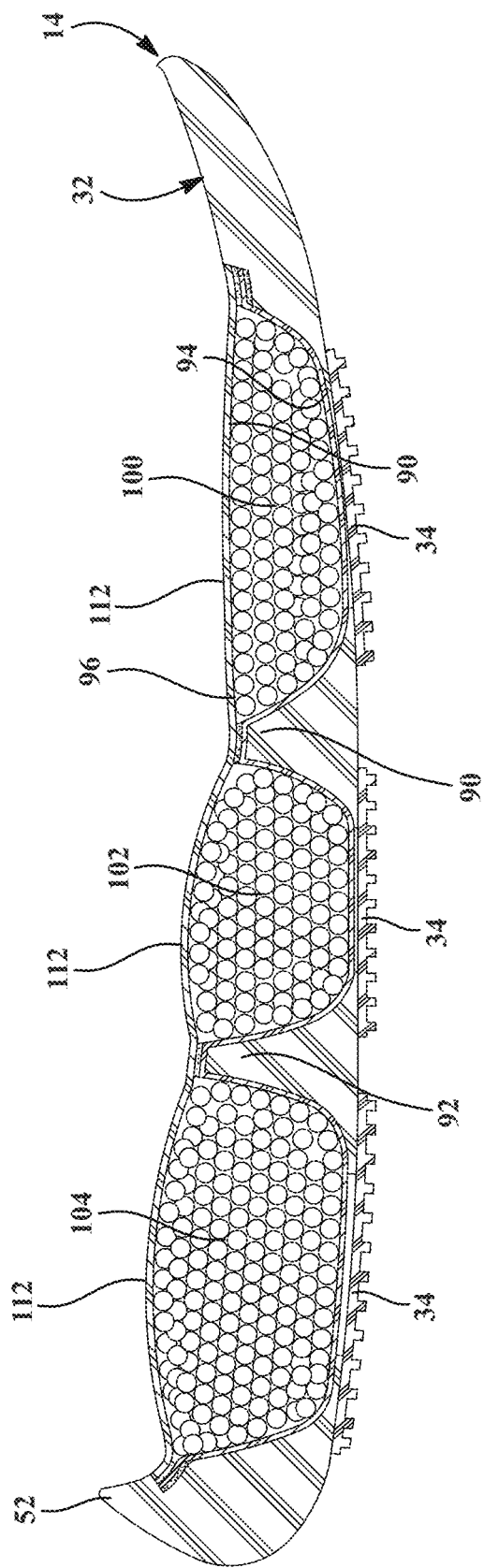

CUSHIONING MEMBER FOR ARTICLE OF FOOTWEAR AND METHOD OF MAKING

CROSS REFERENCE TO RELATED APPLICATIONS

This application is a continuation of U.S. application Ser. No. 16/933,687, filed Jul. 20, 2020, which claims priority under 35 U.S.C. § 119(e) to U.S. Provisional Application No. 62/878,706, filed Jul. 25, 2019 and to U.S. Provisional Application No. 62/923,661, filed Oct. 21, 2019, the disclosures of which are hereby incorporated by reference in their entireties.

FIELD

The present disclosure relates to cushioning members incorporating particulate matter for use with articles of footwear and more particularly to methods of making cushioning members incorporating particulate matter for use with articles of footwear.

BACKGROUND

This section provides background information related to the present disclosure which is not necessarily prior art.

Articles of footwear conventionally include an upper and a sole structure. The upper may be formed from any suitable material(s) to receive, secure, and support a foot on the sole structure. The upper may cooperate with laces, straps, or other fasteners to adjust the fit of the upper around the foot. A bottom portion of the upper, proximate to a bottom surface of the foot, attaches to the sole structure.

Sole structures generally include a layered arrangement extending between a ground surface and the upper. One layer of the sole structure includes an outsole that provides abrasion-resistance and traction with the ground surface. The outsole may be formed from rubber or other materials that impart durability and wear-resistance, as well as enhance traction with the ground surface. Another layer of the sole structure includes a midsole disposed between the outsole and the upper. The midsole provides cushioning for the foot and is generally at least partially formed from a polymer foam material that compresses resiliently under an applied load to cushion the foot by attenuating ground-reaction forces. The midsole may define a bottom surface on one side that opposes the outsole and a footbed on the opposite side that may be contoured to conform to a profile of the bottom surface of the foot. Sole structures may also include a comfort-enhancing insole or a sockliner located within a void proximate to the bottom portion of the upper.

Midsoles using polymer foam materials are generally configured as a single slab that compresses resiliently under applied loads, such as during walking or running movements. Generally, single-slab polymer foams are designed with an emphasis on balancing cushioning characteristics that relate to softness and responsiveness as the slab compresses under gradient loads. Polymer foams providing cushioning that is too soft will decrease the compressibility and the ability of the midsole to attenuate ground-reaction forces after repeated compressions. Conversely, polymer foams that are too hard and, thus, very responsive, sacrifice softness, thereby resulting in a loss in comfort. While different regions of a slab of polymer foam may vary in density, hardness, energy return, and material selection to balance the softness and responsiveness of the slab as a whole, creating a single slab of polymer foam that loads in a gradient manner from soft to responsive is difficult to achieve.

DRAWINGS

The drawings described herein are for illustrative purposes only of selected configurations and are not intended to limit the scope of the present disclosure.

FIG. 27 is a cross-sectional view of a sole structure incorporating the cushioning member of FIG. 26.

Corresponding reference numerals indicate corresponding parts throughout the drawings.

DETAILED DESCRIPTION

Figure 1:
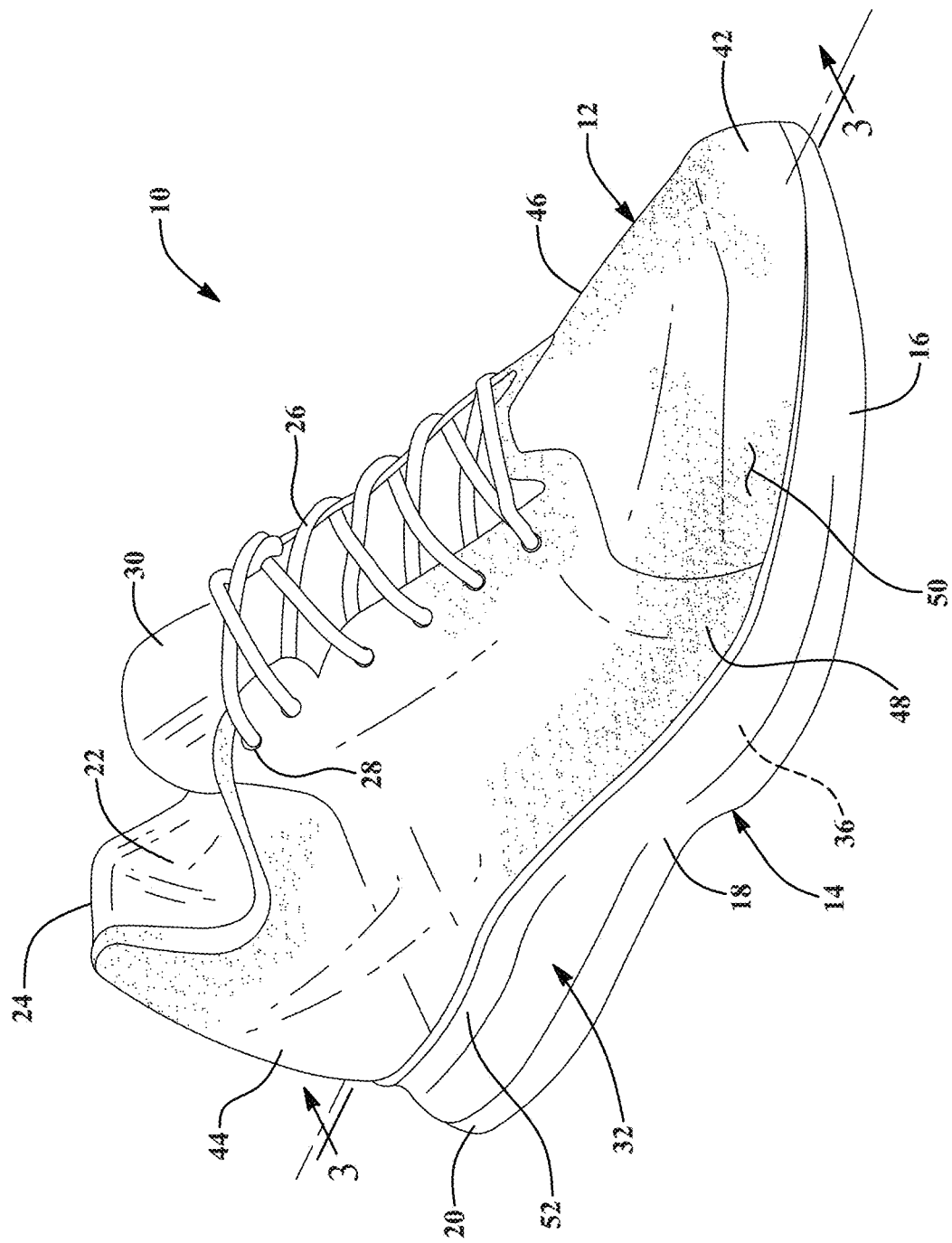
FIG. 1 is a perspective view of an article of footwear in accordance with the principals of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

One aspect of the disclosure provides a method of making a cushioning member. The method includes forming a first barrier member from a first material, the first barrier member including a first compartment and a second compartment. The method further includes forming a second barrier member from a second material different than the first material. The first compartment is provided with a first quantity of particulate matter and the second compartment is provided with a second quantity of particulate matter. The method further includes covering the first compartment with the second barrier member and covering the second compartment with the second barrier member.

Implementations of the disclosure may include one or more of the following optional features. In some implementations, forming the first barrier member includes forming a sheet of the first material into a shape defining the first compartment and the second compartment. Forming the first barrier member from the first material may include forming the first barrier member from a polymer. In some examples, forming the first barrier member from the first material includes forming the first barrier member from thermoplastic polyurethane (TPU). Forming the second barrier member from the second material may include forming the second barrier member from spandex.

Providing the first compartment with the first quantity of particulate matter may include providing the first compartment with a quantity of particulate matter that is approximately the same as the second quantity of particulate matter. In some examples, providing the first compartment with the first quantity of particulate matter includes providing the first compartment with a quantity of particulate matter that is different than the second quantity of particulate matter. Providing the first compartment with the first quantity of particulate matter and providing the second compartment with the second quantity of particulate matter may include providing the first compartment and the second compartment with foam beads.

In some examples, providing the first compartment and the second compartment with foam beads includes providing foam beads having a substantially spherical shape. Providing the first compartment and the second compartment with foam beads may include providing foam beads having approximately the same size and shape. Alternatively, providing the first compartment and the second compartment with foam beads may include providing foam beads having a different size and shape.

In some implementations, forming the first barrier member from the first material and forming the second barrier member from the second material includes forming one of the first barrier member and the second barrier member from a permeable material and forming the other of the first barrier member and the second barrier member from an impermeable material. For example, forming the first barrier member from the first material and forming the second barrier member from the second material may include forming the first barrier member from an impermeable material and forming the second barrier member from a permeable material. In some examples, providing the first compartment with the first quantity of particulate matter and providing the second compartment with the second quantity of particulate matter occurs before the first compartment and the second compartment are coved by the second barrier member. Alternatively, providing the first compartment with the first quantity of particulate matter and providing the second compartment with the second quantity of particulate matter occurs after the first compartment and the second compartment are coved by the second barrier member.

In some implementations, the method includes attaching the second barrier member to the first barrier member. Attaching the second barrier member to the first barrier member may include attaching the second barrier member to the first barrier member at a first attachment location that surrounds the first compartment and may include attaching the second barrier member to the first barrier member at a second attachment location that surrounds the second compartment. In some examples, attaching the second barrier member to the first barrier member includes attaching the second barrier member to the first barrier member via an adhesive. Attaching the second barrier member to the first barrier member via an adhesive may include attaching the second barrier member to the first barrier member via a hot melt adhesive. Forming the first barrier member from the first material may include applying heat and a vacuum to a sheet of the first material. Additionally or alternatively, forming the first barrier member from the first material may include compression molding a sheet of the first material within a die.

In some examples, providing the first compartment with the first quantity of particulate matter and providing the second compartment with the second quantity of particulate matter includes injecting the first quantity of particulate matter between the first barrier member and the second barrier member at a first port in fluid communication with the first compartment. The method also includes injecting the second quantity of particulate matter between the first barrier member and the second barrier member at a second port in fluid communication with the second compartment. The first port and the second port may be sealed after injection of the first quantity of particulate matter into the first compartment and after injection of the second quantity of particulate matter into the second compartment. Sealing the first port and the second port may include attaching the first barrier member to the second barrier member using radio frequency (RF) welding.

Another aspect of the disclosure provides a method of making a sole structure for an article of footwear. The method includes providing a midsole with a first cavity and a second cavity. A first barrier member is formed from a first material and includes a first compartment and a second compartment and a second barrier member is formed from a second material. The method also includes providing the first compartment with a first quantity of particulate matter, providing the second compartment with a second quantity of particulate matter, and covering the first compartment with the second barrier member. The method further includes covering the second compartment with the second barrier member, positioning the first compartment within the first cavity, and positioning the second compartment within the second cavity.

Implementations of the disclosure may include one or more of the following optional features. In some implementations, forming the first barrier member from the first material includes forming the first barrier member from a different material than the second material. Forming the first barrier member may include forming a sheet of the first material into a shape defining the first compartment and the second compartment. Forming the first barrier member from the first material may also include forming the first barrier member from a polymer. Forming the first barrier member from the first material may further include forming the first barrier member from thermoplastic polyurethane (TPU). In some examples, forming the second barrier member from the second material includes forming the second barrier member from spandex.

In some implementations, providing the first compartment with the first quantity of particulate matter includes providing the first compartment with a quantity of particulate matter that is approximately the same as the second quantity of particulate matter. Alternatively, providing the first compartment with the first quantity of particulate matter may include providing the first compartment with a quantity of particulate matter that is different than the second quantity of particulate matter. Providing the first compartment with the first quantity of particulate matter and providing the second compartment with the second quantity of particulate matter may also include providing the first compartment and the second compartment with foam beads.

In some examples, providing the first compartment and the second compartment with foam beads includes providing foam beads having a substantially spherical shape. Further, providing the first compartment and the second compartment with foam beads may include providing foam beads having approximately the same size and shape. Providing the first compartment and the second compartment with foam beads may alternatively include providing foam beads having a different size and shape.

In some implementations, forming the first barrier member from the first material and forming the second barrier member from the second material includes forming one of the first barrier member and the second barrier member from a permeable material and forming the other of the first barrier member and the second barrier member from an impermeable material. For example, forming the first barrier member from the first material and forming the second barrier member from the second material may include forming the first barrier member from an impermeable material and forming the second barrier member from a permeable material. Providing the first compartment with the first quantity of particulate matter and providing the second compartment with the second quantity of particulate matter may occur before the first compartment and the second compartment are coved by the second barrier member. Alternatively, and in some examples, providing the first compartment with the first quantity of particulate matter and providing the second compartment with the second quantity of particulate matter occurs after the first compartment and the second compartment are coved by the second barrier member.

In some examples, the method includes attaching the second barrier member to the first barrier member. Attaching the second barrier member to the first barrier member may include attaching the second barrier member to the first barrier member at a first attachment location that surrounds the first compartment and may include attaching the second barrier member to the first barrier member at a second attachment location that surrounds the second compartment. Attaching the second barrier member to the first barrier member may also include attaching the second barrier member to the first barrier member via an adhesive. Attaching the second barrier member to the first barrier member via an adhesive may include attaching the second barrier member to the first barrier member via a hot melt adhesive. Forming the first barrier member from the first material may include applying heat and a vacuum to a sheet of the first material. Forming the first barrier member from the first material could alternatively include compression molding a sheet of the first material within a die.

In some implementations, providing the first compartment with the first quantity of particulate matter and providing the second compartment with the second quantity of particulate matter includes injecting the first quantity of particulate matter between the first barrier member and the second barrier member at a first port in fluid communication with the first compartment. The method may also include injecting the second quantity of particulate matter between the first barrier member and the second barrier member at a second port in fluid communication with the second compartment. The method may further include sealing the first port and the second port after injection of the first quantity of particulate matter into the first compartment and after injection of the second quantity of particulate matter into the second compartment. Sealing the first port and the second port may include attaching the first barrier member to the second barrier member using radio frequency (RF) welding. Finally, providing the midsole may include forming the midsole from a foamed polymer material.

Yet another aspect of the disclosure provides a method of making a sole structure for an article of footwear. The method includes providing an outsole, providing a midsole, and positioning a cushioning member. The midsole includes a first cavity, a first aperture formed in a first surface of the midsole and in fluid communication with the first cavity, and a second aperture formed in a second surface of the midsole and in fluid communication with the first cavity. The second surface is disposed on an opposite side of the midsole than the first surface and opposes the outsole. The cushioning member includes a first compartment containing a first quantity of particulate matter within the first cavity, whereby the first quantity of particulate matter is visible through the second aperture at the outsole.

This aspect may include one or more of the following optional features. In some implementations, positioning the cushioning member within the first cavity includes positioning a cushioning member having a first barrier member and a second barrier member that cooperate to contain the first quantity of particulate matter within the first compartment. The method also includes shaping the first barrier member to define the first compartment and attaching the second barrier member to the first barrier member. In some examples, the method includes locating an adhesive between the first barrier member and the second barrier member. Locating the adhesive between the first barrier member and the second barrier member may include surrounding the first compartment with the adhesive. Locating the adhesive between the first barrier member and the second barrier member may include locating a hot melt adhesive.

In some examples, the method includes tapering the first compartment in a direction away from the second barrier member. The method may also include covering the first compartment with the second barrier member to define a first interior void, the first quantity of particulate matter being disposed within the first interior void. The method may further include forming the first barrier member from a first material and forming the second barrier member from a second material different than the first material. Forming the first barrier member from a first material may include forming the first barrier member from a polymer. Forming the first barrier member from a first material may include forming the first barrier member from thermoplastic polyurethane (TPU). Forming the second barrier member from a second material may include forming the second barrier member from spandex.

In some examples, forming the first barrier member from a first material and forming the second barrier member from a second material includes forming one of the first material and the second material from a permeable material and the other of the first material and the second material from an impermeable material. For example, forming the first barrier member from a first material and forming the second barrier member from a second material may include forming the first material from an impermeable material and the second material from a permeable material.

In some implementations, positioning a cushioning member including a first compartment containing a first quantity of particulate matter includes positioning a cushioning member containing foam beads. Positioning a cushioning member containing foam beads may include providing foam beads having a substantially spherical shape. Positioning a cushioning member containing foam beads may include providing foam beads having approximately the same size and shape. Alternatively, positioning a cushioning member containing foam beads may include providing foam beads having at least one of a different size and shape.

In some examples, the method includes forming the outsole from one of a transparent material and a translucent material, the first quantity of particulate matter being visible at the second aperture through the material of the outsole. The method may also include providing the midsole with a second cavity, a third aperture formed in the first surface of the midsole and in fluid communication with the second cavity, and a fourth aperture formed in the second surface of the midsole and in fluid communication with the second cavity.

In some implementations, the method includes providing the cushioning member with a second compartment that is received by the second cavity of the midsole and contains a second quantity of particulate matter, the second quantity of particulate matter being visible through the fourth aperture at the outsole. Positioning a cushioning member within the first cavity may also include positioning an outer surface of the cushioning member substantially flush with the first surface of the midsole. Positioning a cushioning member within the first cavity may further include extending an outer surface of the cushioning member from the first surface of the midsole to form at least one bulge. Forming at least one bulge may include forming the at least one bulge at the first compartment.

Figure 2:
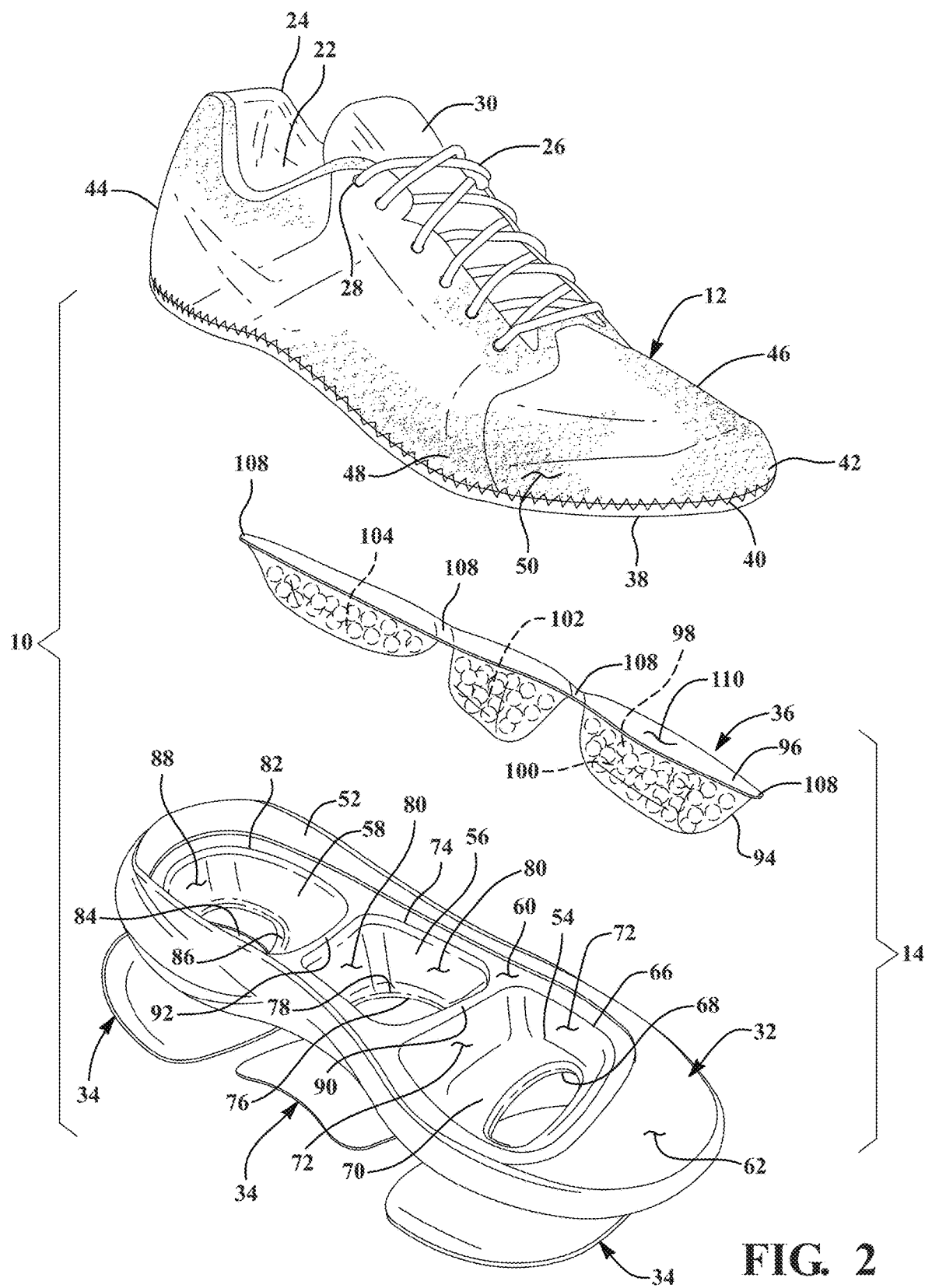
FIG. 2 is an exploded view of the article of footwear of FIG. 2.

With reference to FIGS. 1 and 2, an article of footwear 10 is provided. As shown in FIG. 1, the article of footwear 10 includes an upper 12 and a sole structure 14 attached to the upper 12. The article of footwear 10 may be divided into one or more portions. The portions may include a forefoot region 16, a mid-foot region 18, and a heel region 20. The forefoot region 16 may correspond with toes and joints connecting metatarsal bones with phalanx bones of a foot. The mid-foot region 18 may correspond with an arch area of the foot, and the heel region 20 may correspond with rear portions of the foot, including a calcaneus bone.

The upper 12 includes interior surfaces that define an interior void 22 that receives and secures a foot for support on the sole structure 14. An ankle opening 24 located in the heel region 20 may provide access to the interior void 22. For example, the ankle opening 24 may receive a foot to secure the foot within the void 22 and facilitate entry and removal of the foot from and to the interior void 22. In some examples, one or more fasteners 26 extend along the upper 12 to adjust a fit of the interior void 22 around the foot while concurrently accommodating entry and removal of the foot therefrom. The upper 12 may include apertures 28 such as eyelets and/or other engagement features such as fabric or mesh loops that receive the fasteners 26. The fasteners 26 may include laces, straps, cords, hook-and-loop, or any other suitable type of fastener.

The upper 12 may additionally include a tongue portion 30 that extends between the interior void 22 and the fasteners 26. The upper 12 may be formed from one or more materials that are stitched or adhesively bonded together to form the interior void 22. Suitable materials for the upper may include, but are not limited to, textiles, foam, leather, and synthetic leather. The materials may be selected and located to impart properties of durability, air-permeability, wear-resistance, flexibility, and comfort to the foot while disposed within the interior void 22.

With continued reference to FIGS. 1 and 2, the sole structure 14 is shown as including a midsole 32, an outsole 34, and a cushioning member 36. As shown in FIG. 2, the midsole 32 is generally disposed between the outsole 34 and the upper 12 and supports the cushioning member 36 relative to the upper 12. Namely, the midsole 32 may support the cushioning member 36 between the outsole 34 and a lower substrate 38 of the upper 12. The substrate 38 may be attached to the upper 12 via stitching 40 (FIG. 2) or, alternatively, may be integrally formed with a material of the upper 12. For example, if the upper 12 or a portion of the upper 12 is formed from a knit material, the knit material may likewise form the substrate 38 and, as such, the substrate 38 that opposes the midsole 32 and the cushioning member 36 may be integrally formed with the upper 12.

If the substrate 38 is separately formed from the upper 12, the substrate 38 may be attached to the upper 12 via stitching 40. Regardless of whether the substrate 38 is integrally formed with the upper 12 or, alternatively, is a separate component that is attached to the upper 12, the substrate 38 is disposed generally between the midsole 32 and the upper 12 and is formed from a flexible material. Forming the substrate 38 from a flexible material allows the substrate 38 to stretch and move when loaded by a wearer's foot during use. Allowing the substrate 38 to flex and move in response to a load received by a wearer's foot during use allows the wearer's foot to depress the midsole 32 and/or the cushioning member 36, thereby providing the wearer with a degree of comfort and cushioning during use of the article of footwear 10, as will be described in greater detail below.

The midsole 32 may be formed from a polymer material such as, for example, a foamed polymer material. Namely, the foamed polymer material may be ethyl-vinyl-acetate or polyurethane. Regardless of the particular construction of the midsole 32, the midsole 32 extends generally from an anterior end 42 of the upper 12 to a posterior end 44 of the upper 12. Further, the midsole 32 may extend between a medial side 46 of the upper 12 and a lateral side 48 of the upper 12. In so doing, a portion of the midsole 32 may extend onto an outer surface 50 of the upper 12 proximate to a junction of the upper 12 and the midsole 32. For example, the midsole 32 may include a projection 52 that extends at least partially around a perimeter of the midsole 32 and extends from the midsole 32 to cover a portion of the outer surface 50 of the upper 12. The projection 52 may be integrally formed with the midsole 32 when the material of the midsole is formed into the shape shown in FIG. 2.

Figure 3:
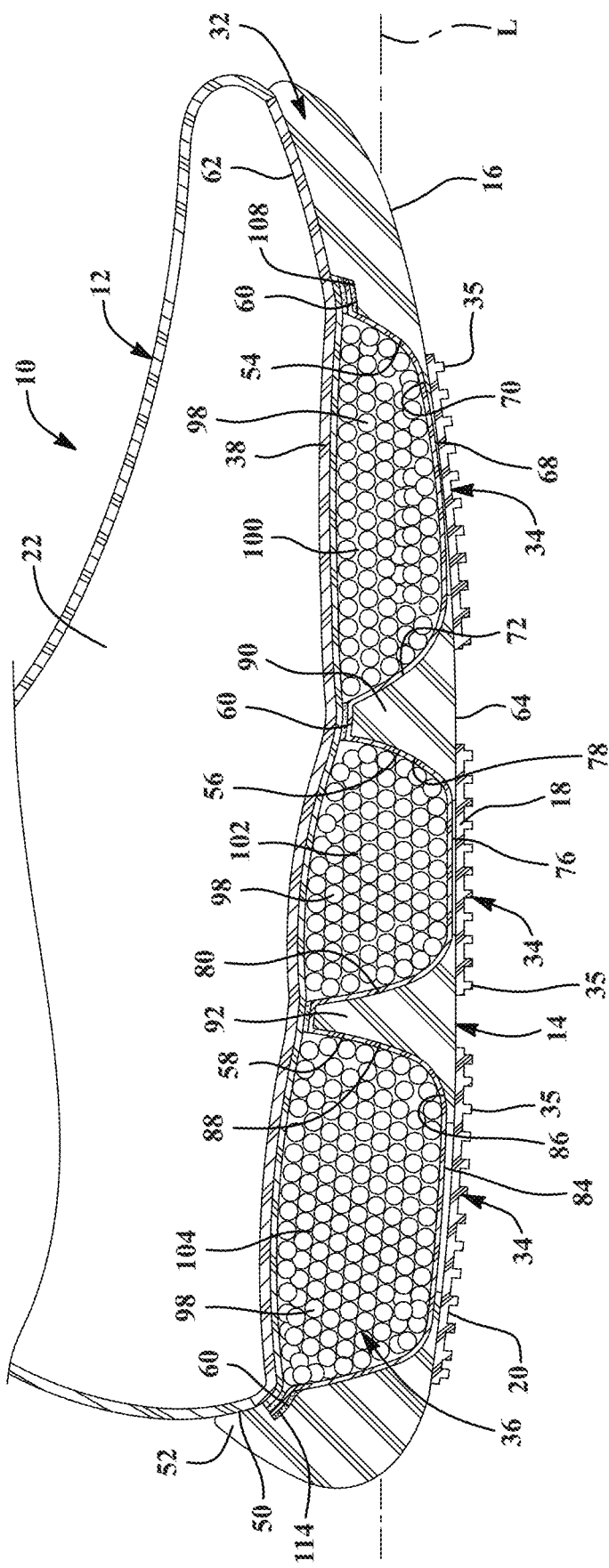
FIG. 3 is a cross-sectional view of a cushioning member of the article of footwear of FIG. 1 taken along Line 3-3 of FIG. 2.

With particular reference to FIGS. 2 and 3, the midsole 32 is shown as including a forefoot cavity 54, a mid-foot cavity 56, and a heel cavity 58. As shown in FIGS. 2 and 3, the cavities 54, 56, 58 are disposed along a length of the sole structure 14 such that the forefoot cavity 54 is disposed in the forefoot region 16, the mid-foot cavity 56 is disposed in the mid-foot region 18, and the heel cavity 58 is disposed in the heel region 20. The cavities 54, 56, 58 are formed in a first surface 60 of the midsole 32 that opposes the substrate 38 of the upper 12. The first surface 60 is recessed from an upper surface 62 of the midsole 32 to provide clearance for a portion of the cushioning member 36 when the cushioning member 36 is disposed within the midsole 32, as will be described in greater detail below. In the illustrated example, the forefoot cavity 54 has an anterior end disposed between a ball portion and a toe portion of the forefoot region.

The midsole 32 additionally includes a second surface 64 located on an opposite side of the midsole 32 than the first surface 60. The second surface 64 opposes the outsole 34 and provides a surface to which the outsole 34 may be attached.

The cavities 54, 56, 58 are each associated with a first aperture and a second aperture of the midsole 32 that permit insertion of the cushioning member 36 into the midsole 32 and visibility of the cushioning member 36 at the outsole 34, respectively, once the cushioning member 36 is inserted into the midsole 32. Specifically, the forefoot cavity 54 defines a first aperture 66 at a junction of the forefoot cavity 54 and the first surface 60. The first aperture 66 defines an opening to the forefoot cavity 54 at the first surface 60 and generally defines a shape of the forefoot cavity 54 at the first surface 60. The forefoot cavity 54 additionally includes a second aperture 68 disposed at an opposite end of the forefoot cavity 54 than the first aperture 66 and formed through a bottom wall 70 of the midsole 32 within the forefoot cavity 54. In one configuration, the bottom wall 70 and, thus, the second aperture 68 may extend in a plane that is substantially parallel to a plane defined by the first surface 60.

As described, the opening to the forefoot cavity 54 at the first surface 60 is generally defined by the shape and size of the first aperture 66 and, further, a bottom portion of the forefoot cavity 54 disposed at an opposite end of the forefoot cavity 54 than the first aperture 66 is generally defined by the bottom wall 70. The forefoot cavity 54 is further defined by a series of side surfaces 72 that extend from the bottom wall 70 to a junction of the first aperture 66 and the first surface 60 around a perimeter of the forefoot cavity 54. Accordingly, the side surfaces 72 cooperate with one another to encircle and define a shape of the forefoot cavity 54 between the bottom wall 70 and the first aperture 66.

The mid-foot cavity 56 is disposed generally between the forefoot cavity 54 and the heel cavity 58 along a longitudinal axis (F) of the sole structure 14 (FIG. 3). The mid-foot cavity 56 includes a first aperture 74 that defines an opening to the mid-foot cavity 56 at the first surface 60. The mid-foot cavity 56 further includes a second aperture 76 disposed at an opposite end of the mid-foot cavity 56 than the first aperture 74 and formed through a bottom wall 78 of the midsole 32. As with the bottom wall 70 associated with the forefoot cavity 54, the bottom wall 78 associated with the mid-foot cavity 56 defines a bottom of the mid-foot cavity 56 and, thus, defines a bottom surface of the mid-foot cavity 56. Side surfaces 80 extend between the first aperture 74 and the bottom wall 78 to define the overall shape of the mid-foot cavity 56. As such, the side surfaces 80 cooperate with the bottom wall 78 to define the overall shape of the mid-foot cavity 56 between the first aperture 74 and the bottom wall 78.

The heel cavity 58 is disposed closer to the posterior end 44 than the forefoot cavity 54 and the mid-foot cavity 56 and includes a first aperture 82 formed in the first surface 60 of the midsole 32. The first aperture 82 defines an opening to the heel cavity 58 and generally defines a shape of a perimeter of the heel cavity 58 at the first surface 60. The heel cavity 58 additionally includes a second aperture 84 disposed at an opposite end of the heel cavity 58 than the first aperture 82 and formed through a bottom wall 86 of the heel cavity of the midsole 32. As with the forefoot cavity 54 and the mid-foot cavity 56, the bottom wall 86 is disposed at an opposite end of the heel cavity 58 than the first aperture 82 and serves to define a bottom surface of the heel cavity 58. Side surfaces 88 extend from the bottom wall 86 to the first aperture 82 and cooperate to define a perimeter of the heel cavity 58.

As described, each of the forefoot cavity 54, the mid-foot cavity 56, and the heel cavity 58 include respective side surfaces 72, 80, 88 that define a shape of each cavity 54, 56, 58. As shown in FIG. 3, one or more of the side surfaces 72, 80, 88 may taper in a direction from the respective first apertures 66, 74, 82 to the respective bottom walls 70, 78, 86. By providing the side surfaces 72, 80, 88 with a taper that extends from the respective first apertures 66, 74, 82 to the respective bottom walls 70, 78, 86, a cross-sectional area of the cavities 54, 56, 58 is generally reduced in a direction extending from the first surface 60 of the midsole 32 to the second surface 64 of the midsole 32. As shown in FIG. 3, the degree to which the side surfaces 72, 80, 88 taper in the direction extending from the first surface 62 to the second surface 64 may vary amongst the cavities 54, 56, 58. For example, the forefoot cavity 54 may include side surfaces 72 having a more gradual taper than either of the side surfaces 80, 88 of the mid-foot cavity 56 and the heel cavity 58, respectively. Further, the side surfaces 88 of the heel cavity 58 may include less of a taper than either of the side surfaces 72, 80 of the forefoot cavity 54 and the mid-foot cavity 56, respectively.

With particular reference to FIG. 3, the forefoot cavity 54, the mid-foot cavity 56, and the heel cavity 58 are shown as being formed into the material of the midsole 32 at spaced apart locations along the longitudinal axis (F) of the sole structure 14. Accordingly, a first wall 90 of the midsole 32 may extend between the forefoot cavity 54 and the mid-foot cavity 56 and a second wall 92 may extend between the mid-foot cavity 56 and the heel cavity 58. Accordingly, the first wall 90 may serve to separate the forefoot cavity 54 from the mid-foot cavity 56 while the second wall 92 serves to separate the mid-foot cavity 56 from the heel cavity 58 in a direction extending along the longitudinal axis (F) of the sole structure 14. As will be described in greater detail below, the walls 90, 92 help to maintain a desired position of the cushioning member 36 relative to the midsole 32 and, thus, help to provide a desired cushioning effect to a foot of a wearer during use of the article of footwear 10.

With particular reference to FIGS. 2 and 3, the cushioning member 36 is shown as including a first barrier member 94, a second barrier member 96, and a quantity of particulate matter 98 contained within the cushioning member 36. In one configuration, the second barrier member 96 is attached to the first barrier member 94 to contain the particulate matter 98 generally between the second barrier member 96 and the first barrier member 94. For example, the cushioning member 36 may include a first compartment 100, a second compartment 102, and a third compartment 104 each respectively incorporating a first quantity of particulate matter 98, a second quantity of particulate matter 98, and a third quantity of particulate matter 98.

The first barrier member 94 and the second barrier member 96 may be formed from flexible materials that allow the first barrier member 94 and the second barrier member 96 to stretch and move during use of the article of footwear 10 when the sole structure 14 is subjected to a force from a foot of a wearer. In one configuration, the first barrier member 94 and the second barrier member 96 are formed from different materials. For example, the first barrier member 94 may be formed from a polymer material such as thermoplastic polyurethane (TPU). Forming the first barrier member 94 from TPU allows the first barrier member 94 to be formed from an impermeable material and, in some configurations, allows the first barrier member 94 to be formed from an optically clear and/or translucent material.

The second barrier member 96 may be formed from a flexible material such as, for example, spandex. Forming the second barrier member 96 from a flexible material such as spandex also allows the second barrier member 96 to be permeable. Forming the second barrier member 96 from a permeable material permits fluid communication through the second barrier member 96 into the first compartment 100, the second compartment 102, and the third compartment 104, thereby permitting air circulation from an area external to the cushioning member 36 into the compartments 100, 102, 104.

The second barrier member 96 may be attached to the first barrier member 94 via an adhesive 106. The adhesive 106 may be a hot melt adhesive and may surround a perimeter of each of the first compartment 100, the second compartment 102, and the third compartment 104. As such, the adhesive 106 joins the material of the second barrier member 96 to the material of the first barrier member 94 between each of the compartments 100, 102, 104, thereby defining an interior void within each compartment 100, 102, 104 between the second barrier member 96 and the first barrier member 94.

Figure 9:
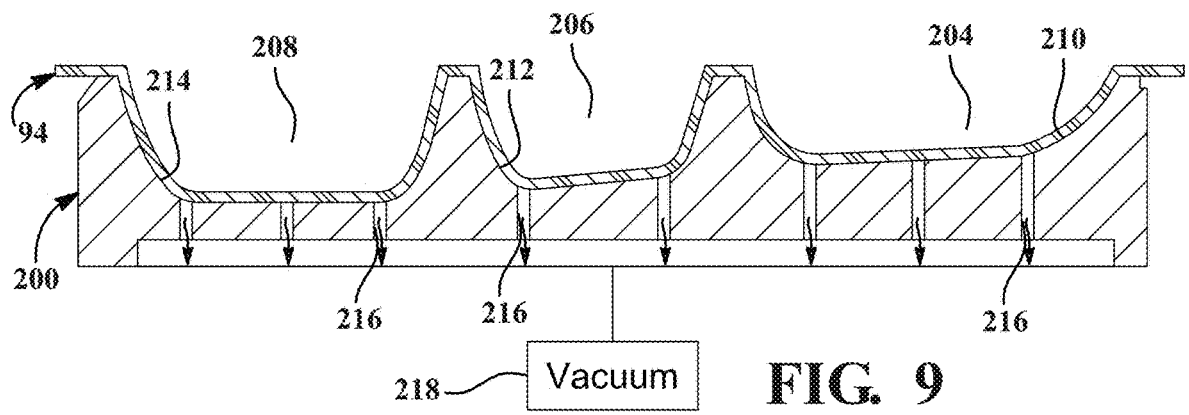
FIG. 9 is a cross-sectional view of the tool of FIG. 8 showing a sheet of material formed into a barrier member of the cushioning member of FIG. 3.

Attaching the second barrier member 96 to the first barrier member 94 around a perimeter of each compartment 100, 102, 104 such that the adhesive 106 completely surrounds each compartment 100, 102, 104 creates a web member 108 in areas where the second barrier member 96 is attached to the first barrier member 94. The web member 108 may extend between each compartment 100, 102, 104 as well as around an outer perimeter of the cushioning member 36, as shown in FIG. 9. The web member 108 may include a thickness that is substantially equal to a depth of the first surface 60 of the midsole 32 relative to the upper surface 62 of the midsole 32. Further, the overall shape of the cushioning member 36 as defined by the web member 108 at a perimeter of the cushioning member 36 may include a shape that is substantially equal to a shape of the first surface 60, as formed into the upper surface 62. Accordingly, when the cushioning member 36 is inserted into the midsole, an upper surface 110 of the cushioning member 36 is substantially flush with the upper surface 62 of the midsole 32, thereby providing a uniform surface that receives the substrate 38. Providing a uniform surface that opposes the substrate 38 provides a degree of comfort to a foot of a wearer by preventing the wearer from feeling a transition or junction between the midsole 32 and the cushioning member 36.

With particular reference to FIG. 3, the cushioning member 36 is shown as including varying amounts of particulate matter 98 disposed within the compartments 100, 102, 104. For example, the first compartment 100, the second compartment 102, and the third compartment 104 are each shown as including different amounts of the particulate matter 98. Namely, the first compartment 100 disposed with the forefoot cavity 54 and, thus, the forefoot region 16 of the sole structure 14, includes less particulate matter 98 than the second compartment 102 and the third compartment 104. Conversely, the third compartment 104 received by the heel cavity 58 of the midsole 32 and, thus, located in the heel region 20 of the sole structure 14, receives a greater amount of particulate matter 98 than the second compartment 102 and the first compartment 100. While the compartments 100, 102, 104 are described and shown as receiving different amounts of particulate matter 98, each compartment 100, 102, 104 may receive approximately the same amount of particulate matter 98. Further, one or more of the compartments 100, 102, 104 may receive a volume of particulate matter 98 that creates a bulge 112 in the outer surface 110 of the cushioning member 36 (FIG. 9). For example, the second compartment 102 and the third compartment 104 of the cushioning member 36 may each include a bulge 112 that extends from a nominal plane defined by the second barrier member 96 at a location of the second compartment 102 and the third compartment 104. Namely, the bulges 112 extend from a nominal plane defined by the web member 108.

Regardless of the amount of particulate matter 98 disposed within the respective compartments 100, 102, 104, the particulate matter 98 may be used to enhance the functionality and cushioning characteristics that the material of the midsole 32 provides. For example, the particulate matter 98 contained within the compartments 100, 102, 104 may include foam beads having a substantially spherical shape. Further, the foam beads defining the particulate matter 98 may have approximately the same size and shape or, alternatively, may have at least one of a different size and shape. Regardless of the particular size and shape of the particulate matter 98, the particulate matter 98 cooperates with the outsole 34 and the midsole 32 to provide the article of footwear 10 with a cushioned and responsive performance during use.

The cushioning member 36 may be inserted into the midsole 32 such that the first compartment 100 is received by the forefoot cavity 54, the second compartment 102 is received by the mid-foot cavity 56, and the third compartment 104 is received by the heel cavity 58. Once the cushioning member 36 is disposed within the midsole 32, the surface 110 of the cushioning member 36 is substantially flush with the upper surface 62 of the midsole 32 at the web member 108 that defines a perimeter of the cushioning member 36. As such, the second barrier member 96 cooperates with the material of the midsole 32 at the upper surface 62 of the midsole 32 to provide a generally uniform surface against which the substrate 38 resides when the sole structure 14 is attached to the upper 12.

The outsole 34 may be formed from a transparent or translucent material and may include one or more discreet portions that are separate from one another. The outsole 34 may be formed from a durable material such as, for example, rubber and may be attached to the second surface 64 of the midsole 32. The individual portions of the outsole 34 may be attached to the second surface 64 of the midsole 32 proximate to the second apertures 68, 76, 84, respectively associated with the forefoot cavity 54, the mid-foot cavity 56, and the heel cavity 58. The portions of the outsole 34 may be separated from one another along a length of the sole structure 14 in a direction substantially parallel to the longitudinal axis (L). While the outsole 34 is described and shown as including individual portions that are spaced apart from one another, the outsole 34 could alternatively have a unitary construction that extends generally across the entire second surface 64 of the midsole 32 such that the outsole 34 extends continuously between the anterior end 42 and the posterior end 44 and between the medial side 46 and the lateral side 48. Regardless of the particular construction of the outsole 34 (i.e., unitary or discrete portions), the outsole 34 may include treads 35 that extend from the outsole 34 to provide increased traction with a ground surface during use of the article of footwear 10.

Forming the outsole 34 from a transparent or translucent material allows the cavities 54, 56, 58 to be viewed from the outsole 34 when the outsole 34 is attached to the midsole 32 at the second surface 64. Further, because the compartments 100, 102, 104 substantially fill the respective cavities 54, 56, 58 of the midsole 32, the compartments 100, 102, 104 and, thus, the particulate matter 98 disposed therein is likewise visible at the second apertures 68, 76, 84 of the midsole 32 through the material of the outsole 34. Accordingly, the particulate matter 98 residing within the respective compartments 100, 102, 104 of the cushioning member 36 is visible through the outsole 34 at the second apertures 68, 76, 84 associated with the respective cavities 54, 56, 58.

The sole structure 14 may be attached to the upper 12 via a suitable adhesive 114 (FIG. 3). For example, the adhesive 114 may extend between and attach the projection 52 of the midsole 32 to the outer surface 50 of the upper 12. Further, the adhesive 114 may attach the web member 108 of the cushioning member 36 to the midsole 32 at a junction of the web member 108 and the first surface 60 of the midsole 32.

With reference to FIGS. 4-7, an article of footwear 10a is provided and includes an upper 12 and a sole structure 14a attached to the upper 12. In view of the substantial similarity in structure and function of the components associated with the article of footwear 10a with respect to the article of footwear 10a, like reference numerals are used hereinafter and in the drawings to identify like components while like reference numerals containing letter extensions are used to identify those components that have been modified.

Figure 4:
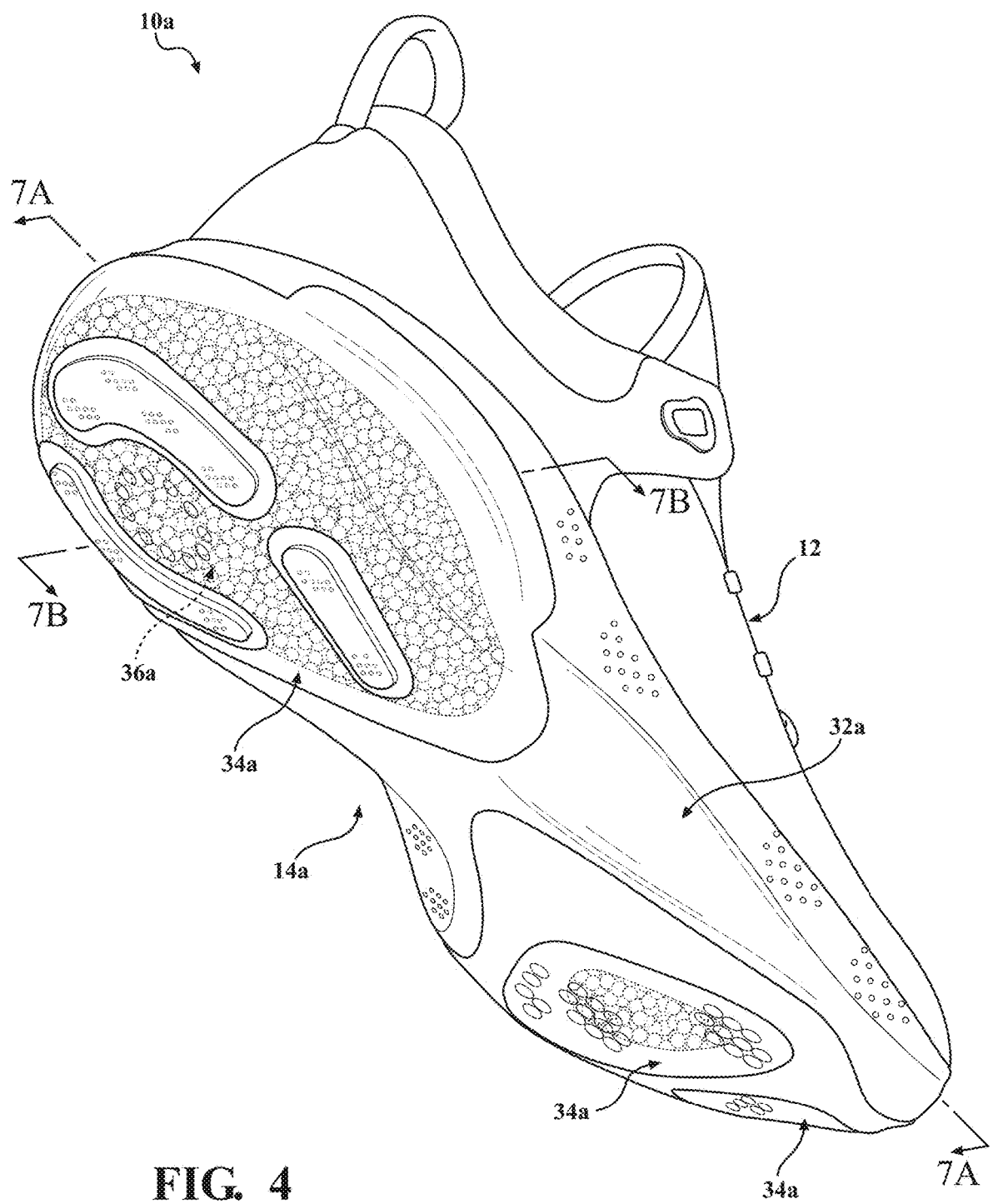
FIG. 4 is a bottom perspective view of an article of footwear in accordance with the principles of the present disclosure.
Figure 5:
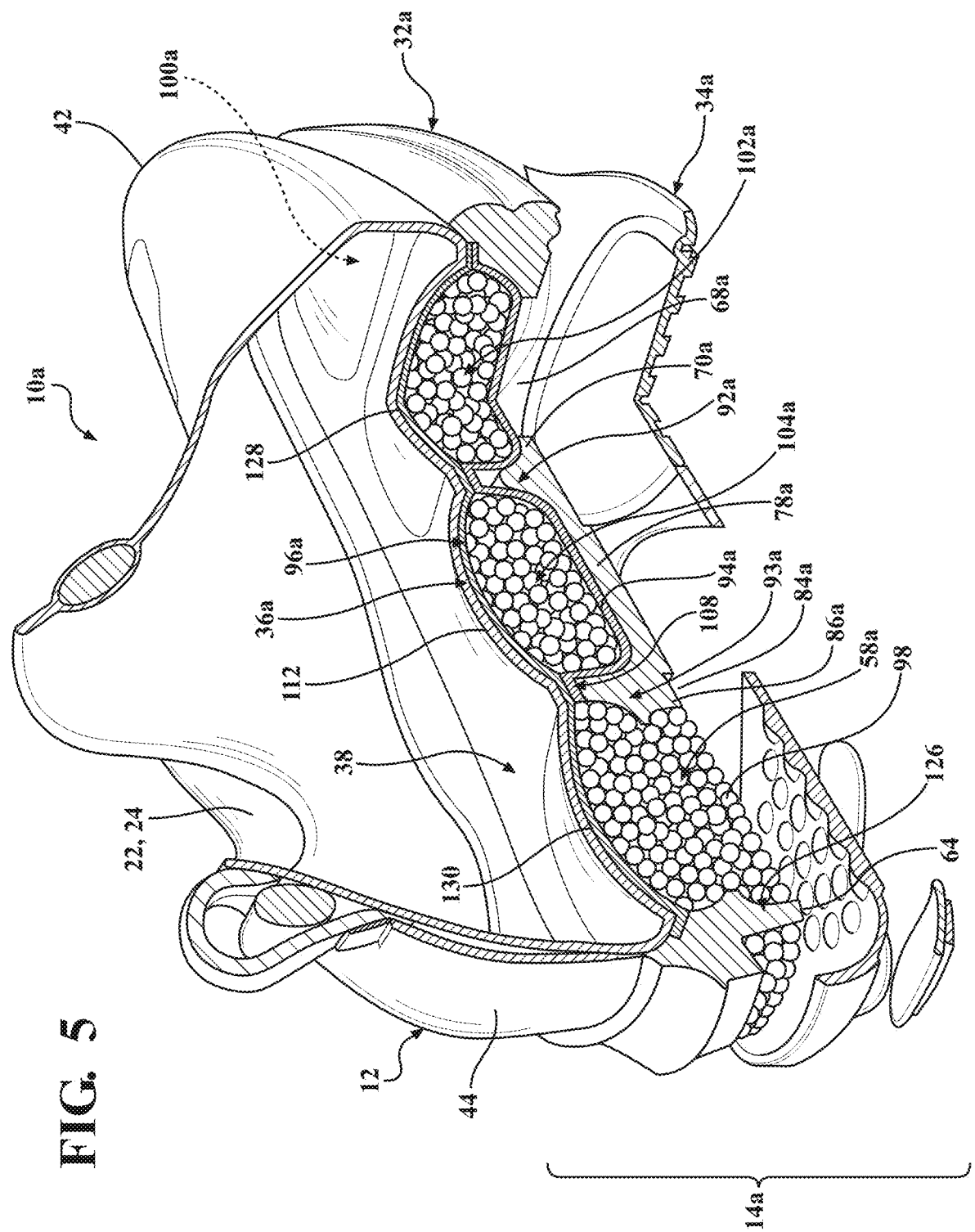
FIG. 5 is a partial perspective cross-sectional view of an article of footwear in accordance with the principles of the present disclosure.

With continued reference to FIG. 4, the sole structure 14a is shown as including a midsole 32a, an outsole 34a, and a cushioning member 36a. As shown in FIG. 5, the midsole 32a is generally disposed between the outsole 34a and the upper 12 and supports the cushioning member 36a relative to the upper 12. Namely, the midsole 32a may support the cushioning member 36a between the outsole 34a and the lower substrate 38 of the upper 12.

Figure 6:
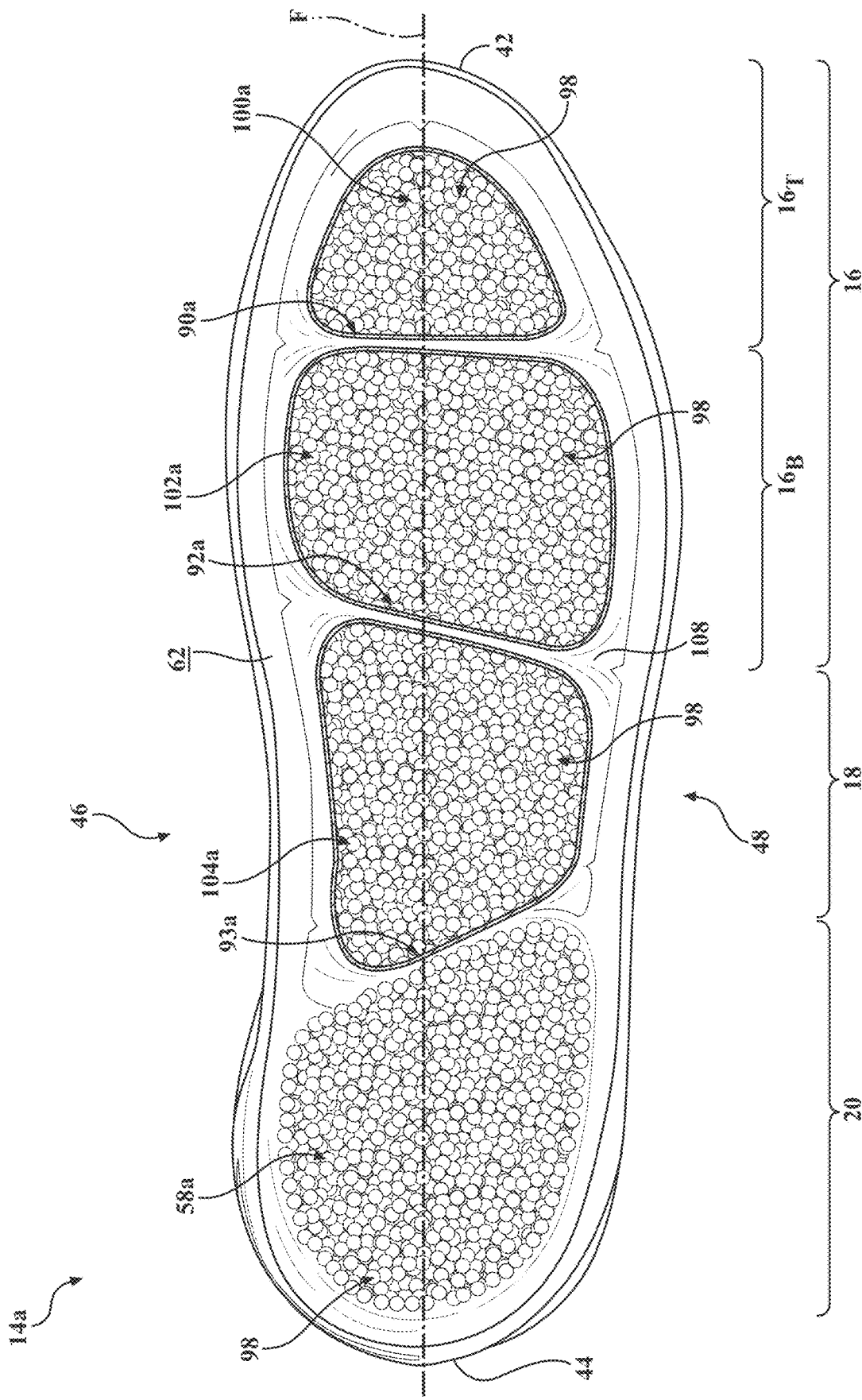
FIG. 6 is a top view of a midsole of the article of footwear of FIG. 4.

As with the example described above, the midsole 32a of FIGS. 4-7 is shown as including a ball cavity 54a, a mid-foot cavity 56a, and a heel cavity 58a. Here, the midsole 32a also includes a toe cavity 116 disposed in the toe region 16T. As shown in FIGS. 5-7, the cavities 54a, 56a, 58a, 116 are disposed along a length of the sole structure 14a such that the toe cavity 116 is disposed in a toe region 16T of the forefoot region 16 adjacent to the anterior end 42 of the upper 12, the ball cavity 54a is disposed in a ball region 16B of the forefoot region 16 adjacent to the toe cavity 116, the mid-foot cavity 56a is disposed in the mid-foot region 18, and the heel cavity 58a is disposed in the heel region 20 adjacent to the posterior end 44. The cavities 54a, 56a, 58a, 116 are formed in a first surface 60 of the midsole 32a that opposes the substrate 38 of the upper 12. The first surface 60 is recessed from an upper surface 62 of the midsole 32a to provide clearance for a portion of the cushioning member 36a when the cushioning member 36a is disposed within the midsole 32a, as will be described in greater detail below.

The cavities 54a, 56a, 58a, 116a are each associated with a first aperture and a second aperture of the midsole 32a that permit insertion of the cushioning member 36a into the midsole 32a and visibility of the cushioning member 36a at the outsole 34a, respectively, once the cushioning member 36a is inserted into the midsole 32a.

Specifically, the ball cavity 54a defines a second aperture 66a at a junction of the ball cavity 54a and the first surface 60. The first aperture 66a defines an opening to the ball cavity 54a at the first surface 60 and generally defines a shape of the ball cavity 54a at the first surface 60. The ball cavity 54a additionally includes a second aperture 68a disposed at an opposite end of the ball cavity 54a than the first aperture 66a and formed through a bottom wall 70a of the midsole 32a.

As described, the opening to the ball cavity 54a at the first surface 60 is generally defined by the shape and size of the first aperture 66a and, further, a bottom portion of the ball cavity 54a disposed at an opposite end of the ball cavity 54a than the first aperture 66a is generally defined by the bottom wall 70a. The ball cavity 54a is further defined by a series of side surfaces 72a that extend from the bottom wall 70a to a junction of the first aperture 66a and the first surface 60 around a perimeter of the ball cavity 54a. Accordingly, the side surfaces 72a cooperate with one another to define a shape of the ball cavity 54a between the bottom wall 70a and the first aperture 66a.

The mid-foot cavity 56a is disposed generally between the ball cavity 54a and the heel cavity 58a along a longitudinal axis (F) of the sole structure 14a (FIG. 6). The mid-foot cavity 56a includes a first aperture 74a that defines an opening to the mid-foot cavity 56a at the first surface 60. However, unlike the example above, the bottom end of the mid-foot cavity 56a is enclosed by a bottom wall 78a of the midsole 32a such that the mid-foot cavity 54a terminates Side surfaces 80a extend between the first aperture 74a and the bottom wall 78a to define the overall shape of the mid-foot cavity 56a. As such, the side surfaces 80a cooperate with the bottom wall 78a to define the overall shape of the mid-foot cavity 56a between the first aperture 74a and the bottom wall 78.

The heel cavity 58a is disposed closer to the posterior end 44 than the ball cavity 54a and the mid-foot cavity 56a and includes a first aperture 82a formed in the first surface 60 of the midsole 32a. The first aperture 82a defines an opening to the heel cavity 58a and generally defines a shape of a perimeter of the heel cavity 58a at the first surface 60. The heel cavity 58a additionally includes a second aperture 84a disposed at an opposite end of the heel cavity 58a than the first aperture 82a and formed through a bottom wall 86 of the third cavity of the midsole 32a. As with the ball cavity 54a and the mid-foot cavity 56a, the bottom wall 86 is disposed at an opposite end of the heel cavity 58a than the first aperture 82a and serves to define a bottom surface of the heel cavity 58a. Side surfaces 88a extend from the bottom wall 86 to the first aperture 82a and cooperate to define a perimeter of the heel cavity 58a.

The toe cavity 116 is disposed in the toe region 16T between the ball cavity 54a and the anterior end 42 and includes a first aperture 118 formed in the first surface 60 of the midsole 32a. The first aperture 118 defines an opening to the toe cavity 116 and generally defines a shape of a perimeter of the toe cavity 116 at the first surface 60. The toe cavity 116 additionally includes a second aperture 120 disposed at an opposite end of the toe cavity 116 than the first aperture 118 and formed through a bottom wall 122 of the toe cavity 116 of the midsole 32a. The bottom wall 122 is disposed at an opposite end of the toe cavity 116 than the first aperture 118 and serves to define a bottom surface of the toe cavity 116. Side surfaces 124a extend from the bottom wall 122 to the first aperture 118 and cooperate to define a perimeter of the toe cavity.

Figure 7A:
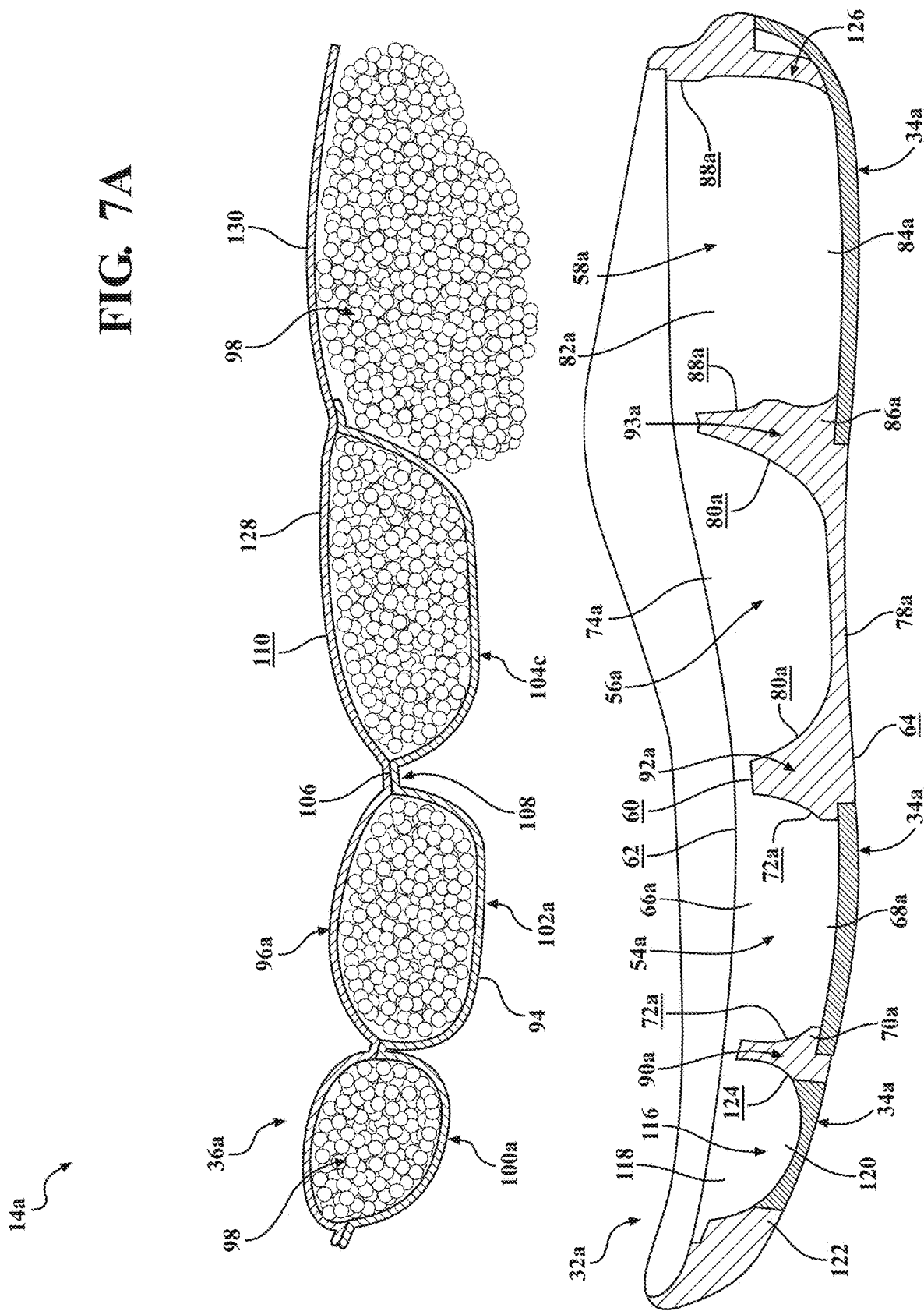
FIG. 7A is an exploded, cross-sectional view of a sole structure of the article of footwear of FIG. 4, taken along a longitudinal axis of the article of footwear.

As described, each of the ball cavity 54a, the mid-foot cavity 56a, the heel cavity 58a, and the toe cavity 116 include respective side surfaces 72a, 80a, 88a, 124 that define a shape of each cavity 54, 56, 58, 116. As shown in FIG. 7A, one or more of the side surfaces 72a, 80a, 88a, 124 may taper in a direction from the respective first apertures 66a, 74a, 82a, 118 to the respective bottom walls 70a, 78a, 86a, 122. By providing the side surfaces 72a, 80a, 88a, 124 with a taper that extends from the respective first apertures 66a, 74a, 82a to the respective bottom walls 70a, 78, 86, a cross-sectional area of the cavities 54a, 56a, 58a, 116a is generally reduced in a direction extending from the first surface 60 of the midsole 32a to the second surface 64 of the midsole 32a.

Figure 7B:
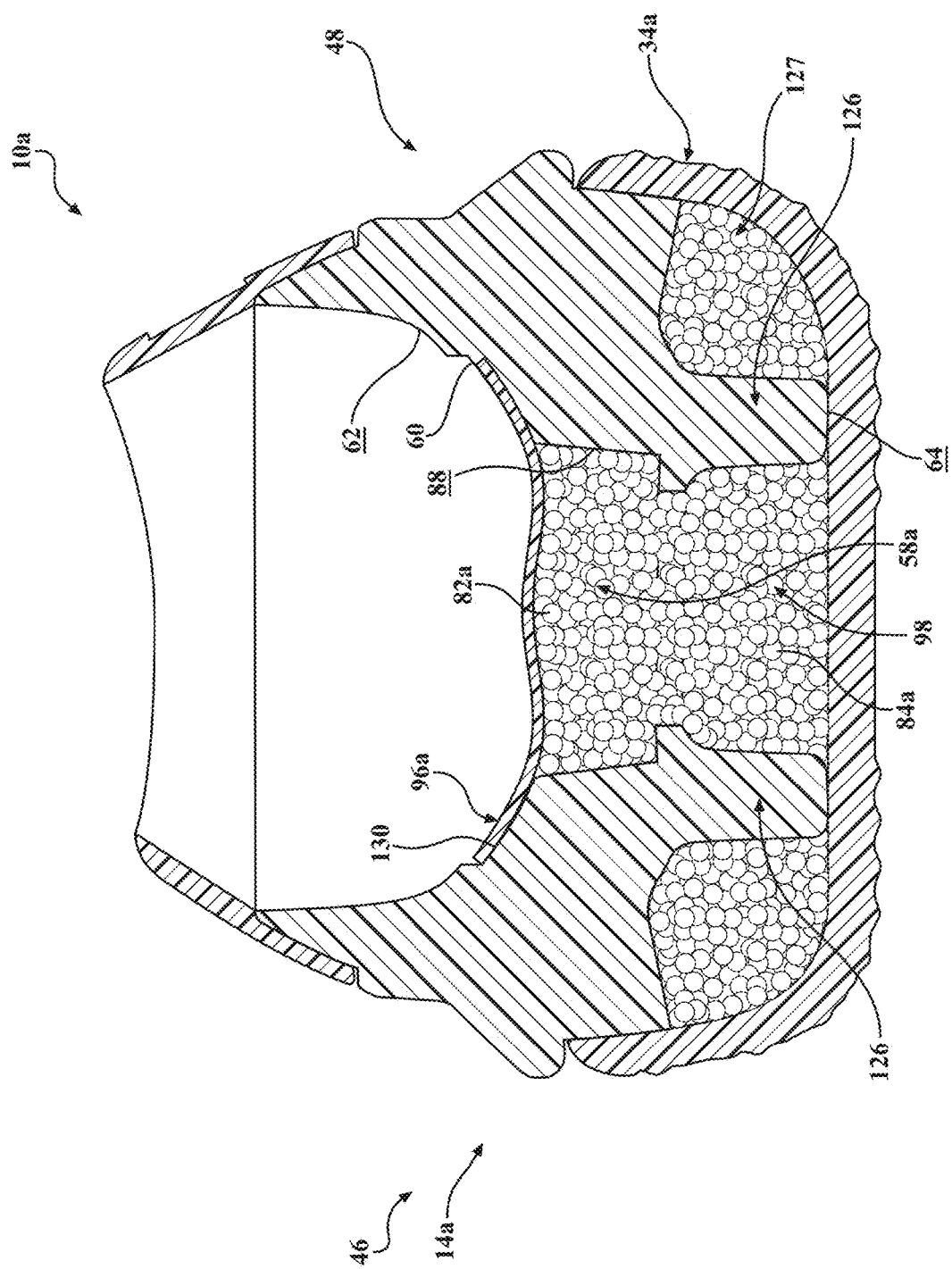
FIG. 7B is a cross-sectional view of a sole structure of the article of footwear of FIG. 4, taken across a heel region of the article of footwear.

With particular reference to FIGS. 7A and 7B, the toe cavity 116, the ball cavity 54a, the mid-foot cavity 56a, and the heel cavity 58a are shown as being formed into the material of the midsole 32a at spaced apart locations along the longitudinal axis (F) of the sole structure 14a. Accordingly, a first wall 90a of the midsole 32a may extend between the toe cavity 116 and the ball cavity 54a, a second wall 92a may extend between the ball cavity 54a and the mid-foot cavity 56a, and a third wall 93a may extend between the mid-foot cavity 56a and the heel cavity 58a.

One or more of the cavities 54a, 56a, 58a, 116 may include structural features configured to modify physical properties of the midsole 32a. For example, in the illustrated example, the heel cavity 58a is surrounded by one or more pillars 126 projecting downwardly around the posterior end 44. Adjacent ones of the pillars 126 are spaced apart from each other and are configured to interface with the outsole 34a when the sole structure 14a is assembled, thereby providing support to the article of footwear 10a in the heel region 20. As shown in FIG. 5, the particulate matter 98 is able to migrate from the heel cavity 58a and into a peripheral region 127 surrounding the pillars 126 to provide cushioning between the outsole 34a and the midsole 32a at the posterior end 44.

With continued reference to FIGS. 5 and 7, the cushioning member 36a is shown as including a first barrier member 94a, a second barrier member 96a, and a quantity of particulate matter 98 contained within the cushioning member 36a. In one configuration, the second barrier member 96a is attached to the first barrier member 94a to contain the particulate matter 98 generally between the second barrier member 96a and the first barrier member 94a. For example, the cushioning member 36a may include a first compartment 100a, a second compartment 102a, and a third compartment 104a each respectively incorporating a first quantity of particulate matter 98, a second quantity of particulate matter 98, and a third quantity of particulate matter 98.

Unlike the example of FIGS. 1-3, where all of the particulate matter 98 is distributed among the three compartments 100a, 102a, 104a, in the example of FIGS. 4-7 the cushioning member 36a is configured as a hybrid cushioning member 36a, where a first portion of the particulate matter 98 is contained within the compartments 100a, 102a, 104a formed by joining the first barrier layer 94a and the second barrier layer 96a, and a second portion of the particulate matter is disposed directly within one of the cavities 54a, 56a, 58a, 116a and sealed within the cavity by the second barrier layer 96a. For instance, as shown in the examples of FIGS. 4-7, the cushioning member 36a may form a series of three compartments in the toe region 16T, the ball region 16B, and the mid-foot region 18, while particulate matter in the heel region 20 is disposed directly within the heel cavity 58a formed in the heel region 20. Here the second barrier layer 96a extends over the heel cavity 58a to enclose the particulate matter 98 therein.

While the shape and configuration of the cushioning member 36a may be different from that of the cushioning member 36 of FIGS. 1-3, the cushioning member 36a may be formed using similar materials and methods to those described above with respect to the cushioning member 36. That is, the first barrier member 94a and the second barrier member 96a may be formed from flexible materials that allow the first barrier member 94a and the second barrier member 96a to stretch and move during use of the article of footwear 10a when the sole structure 14a is subjected to a force from a foot of a wearer. The second barrier member 96a may be attached to the first barrier member 94a via the adhesive 106. Attaching the second barrier member 96a to the first barrier member 94a around a perimeter of each compartment 100a, 102a, 104a such that the adhesive 106 completely surrounds each compartment 100a, 102a, 104a creates the web member 108 in areas where the second barrier member 96a is attached to the first barrier member 94a.

With particular reference to FIGS. 7A and 7B, the cushioning member 36a is shown as including varying amounts of particulate matter 98 disposed within the compartments 100a, 102a, 104a. For example, the first compartment 100a, the second compartment 102a, and the third compartment 104a are each shown as including different amounts of the particulate matter 98. Namely, the first compartment 100a disposed with the toe cavity 116 and, thus, the toe region 16T of the sole structure 14a, includes less particulate matter 98 than the second compartment 102a and the third compartment 104a. Conversely, the third compartment 104a received by the mid-foot cavity 54a of the midsole 32a and, thus, located in the mid-foot region 18 of the sole structure 14a, receives a greater amount of particulate matter 98 than the second compartment 102a and the first compartment 100a. While the compartments 100a, 102a, 104a are described and shown as receiving different amounts of particulate matter 98, each compartment 100a, 102a, 104a may receive approximately the same amount of particulate matter 98. Further, one or more of the compartments 100a, 102a, 104a may receive a volume of particulate matter 98 that creates a bulge 112 in the outer surface 110 of the cushioning member 36a (FIG. 5). For example, the second compartment 102a and the third compartment 104a of the cushioning member 36a may each include a bulge 112 that extends from a nominal plane defined by the second barrier member 96a at a location of the second compartment 102a and the third compartment 104a. Namely, the bulges 112 extend from a nominal plane defined by the web member 108.

As provided above, the compartments 100a, 102a, 104a are configured to be received within each of the toe cavity 116, the ball cavity 54a, and the mid-foot cavity 56a. However, the heel cavity 58a does not receive a corresponding chamber of the cushioning member 36a. Instead, the particulate matter 98 is provided directly to the heel cavity 58a. Here, the particulate matter 98 is contained in the lateral direction by the side surfaces 88 of the heel cavity 58a, while the second aperture 84a on the bottom of the heel cavity 58a is enclosed by a portion of the outsole 34a and the first aperture 82a on the top of the heel cavity 58a is enclosed by a portion of the second barrier member 96a.

With reference to FIGS. 5 and 7A, the cushioning member 36a includes the first barrier layer 94a forming a lower portion of the cushioning member 36a including the compartments 100a, 102a, 104a. The second barrier member 96a includes a first portion 128 extending over each of the compartments 100a, 102a, 104a and joined to the first barrier member 94a to form the web member 108 in the forefoot region 16 and the mid-foot region 18. Additionally, the second barrier member 96a includes a second portion 130 extending beyond the first barrier member 94a and through the heel region 20 to cover the heel cavity 58a. Thus, unlike the first portion 128, which is attached to the first barrier member 94a along the web member 108, the second portion 130 of the second barrier member 96a is attached directly to the midsole 32a and surrounds an outer periphery of the first aperture 82a of the heel cavity 58a. In some examples, the second portion 130 is attached to first surface 60 of the midsole 32a such that the portion of the upper surface 110 of the cushioning member 36a formed by the second portion 130 is substantially flush with the upper surface 62 of the midsole 32a.

The outsole 34a may be formed from a transparent or translucent material and may include one or more discreet portions that are separate from one another. The outsole 34a may be formed from a durable material such as, for example, rubber and may be attached to the second surface 64 of the midsole 32a. The individual portions of the outsole 34a may be attached to the second surface 64 of the midsole 32a proximate to the second apertures 120, 68a, 84a, respectively associated with the toe cavity 116, the ball cavity 54a, and the heel cavity 58a. The portions of the outsole 34a may be separated from one another along a length of the sole structure 14a in a direction substantially parallel to the longitudinal axis (F). While the outsole 34a is described and shown as including individual portions that are spaced apart from one another, the outsole 34a could alternatively have a unitary construction that extends generally across the entire second surface 64 of the midsole 32a such that the outsole 34a extends continuously between the anterior end 42 and the posterior end 44 and between the medial side 46 and the lateral side 48. Regardless of the particular construction of the outsole 34a (i.e., unitary or discrete portions), the outsole 34a may include treads 35 that extend from the outsole 34a to provide increased traction with a ground surface during use of the article of footwear 10a.

Incorporation of the cushioning member 36, 36a into the article of footwear 10, 10a provides a degree of comfort and cushioning to a foot of a wearer during use. For example, and as described above, the substrate 38, 38a and the second barrier member 96, 96a of the cushioning member 36, 36a are formed from flexible materials. Accordingly, when a force is applied to the substrate 38, 38a during use of the article of footwear 10, 10a by a foot of a wearer, the force causes the substrate 38, 38a and the material of the second barrier member 96, 96a to flex and stretch, thereby allowing the foot of the wearer to engage and displace the particulate matter 98 disposed within the cavities 54, 54a, 56, 56a, 58, 58a, 116. In so doing, the particulate matter 98 exerts a force on the material of the first barrier member 94, 94a, thereby causing the first barrier member 94, 94a to likewise flex and stretch. Such movement of the first barrier member 94, 94a compresses a material of the midsole 32, 32a generally surrounding the compartments 100, 100a, 102, 102a, 104, 104a or cavities 54, 54a, 56, 56a, 58, 58a, 116 which, in turn, absorbs forces associated with a walking or running movement.

Flexing and stretching of the materials of the substrate 38, 38a, the first barrier member 94, 94a, and the second barrier 96, 96a along with compression of the material of the midsole 32, 32a provides a degree of cushioning and comfort to a wearer while wearing the article of footwear 10, 10a. Further, interaction between a foot of a wearer with the particulate matter 98—permitted by the generally flexible nature of the material of the substrate 38, 38a and the second barrier member 96, 96a—likewise provides cushioning to the foot of the wearer. Further, because the particulate matter 98 is permitted to move relative to and within each cavity 54, 54a, 56, 56a, 58, 58a, 116, the particulate matter 98 conforms to a shape of the wearer's foot and, thus, provides a degree of tailored cushioning that is specific to the shape of the wearer's foot. Further yet, because the particulate matter 98 is permitted to move relative to and within the first compartment 100, 100a, the second compartment 102, 102a, the third compartment 104, 104a, and/or the heel cavity 58a, the shape of the substrate 38, 38a and the second barrier member 96, 96a is dynamic and is largely based on the applied loads at the substrate 38, 38a at any given time. In other words, the support provided by the particulate matter 98 disposed within the cavities 54, 54a, 56, 56a, 58, 58a, 116 moves and shifts in response to the applied forces at the substrate 38, 38a. In so doing, the effective shape of the substrate 38, 38a and the second barrier member 96, 96a is constantly changing as the wearer applies forces at different locations of the substrate 38, 38a, thereby causing the particulate matter 98 to shift and move relative to within the cavities 54, 54a, 56, 56a, 58, 58a, 116. As such, the cushioning member 36, 36a provides the sole structure 14, 14a and, thus, the article of footwear 10, 10a with cushioning and support that dynamically responds to an applied force and automatically conforms to a shape of the wearer's foot, thereby providing the wearer with a tailored and personal cushioning system.

With respect to the example of the sole structure 14a in FIGS. 4-7, providing the particular matter directly to one of the cavities (e.g., the heel cavity 58a) provides the particulate matter 98 with an increased degree of freedom in comparison to the particulate matter 98 enclosed within a compartment of a cushioning member 36, 36a. For example, in instances where one of the cavities is formed with structural features, such as pillars or cross-members, the particulate matter 98 will be unconstrained within the cavity and free to migrate around the interior structures.

With particular reference to FIGS. 8-13, a method of making the cushioning member 36 will be described in detail. While the illustrated method is provided with respect to the cushioning member 36 of FIGS. 1-3, it will be appreciated that the method may also by applied to forming the cushioning member 36a of FIGS. 4-7. As will be described in detail below, the method of forming the cushioning member 36 shown in FIGS. 8-11 utilizes a thermoforming process to form the first barrier member 94 and, further, uses a heat press to attach the second barrier member 96 to the first barrier member 94 following insertion of the particulate matter 98 into the first compartment 100, the second compartment 102, and the third compartment 104.

Figure 8:
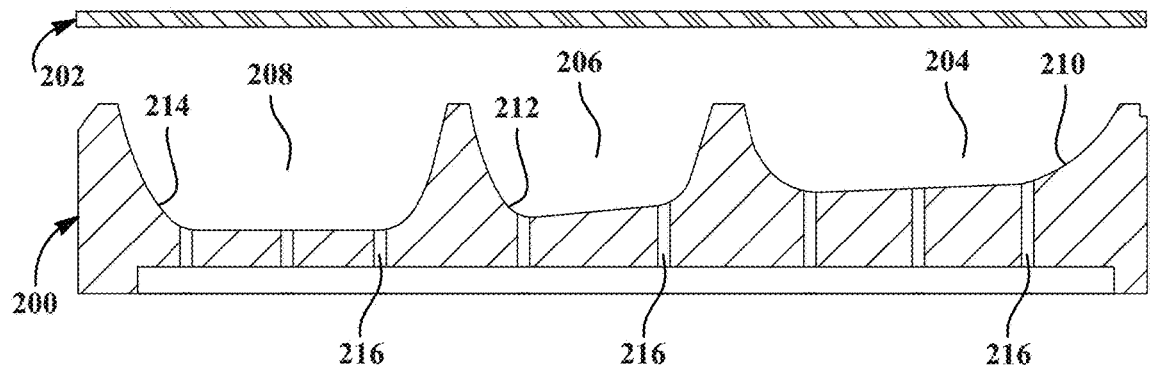
FIG. 8 is a cross-sectional view of a tool for use in forming the cushioning member of FIG. 3.

As shown in FIG. 8, a tool 200 may be used to form a sheet of material 202 into the first barrier member 94. For example, and as described above, the first barrier member 94 may be formed from thermoplastic polyurethane (TPU). Accordingly, the sheet of material 202 may be a sheet of TPU material. The tool 200 may include a forefoot cavity 204, a mid-foot cavity 206, and a heel cavity 208. The forefoot cavity 204 may include an arcuate surface 210 that provides the first compartment 100 with the shape shown in FIG. 9. Similarly, the mid-foot cavity 206 may correspond with the second compartment 102 and the heel cavity 208 may correspond with the third compartment 104, whereby the mid-foot cavity 206 includes an arcuate surface 212 that conforms to the shape of the second compartment 102 and the heel cavity 208 includes an arcuate surface 214 that conforms to the shape of the third compartment 104. The tool 200 may additionally include a series of vacuum ports 216 that are attached to a vacuum 218 (FIG. 9).

In operation, the sheet of material 202 may be placed adjacent to the tool 200 such that the sheet of material 202 opposes the forefoot cavity 204, the mid-foot cavity 206, and the heel cavity 208. Heat may be applied to the sheet of material 202 before and/or during application of a vacuum force on the sheet of material 202 via the vacuum ports 216. For example, the sheet of material 202 may be heated by an external heat source (not shown) and/or via heating elements (not shown) disposed within the tool 200 to heat the sheet of material 202 at the same time the sheet of material 202 is drawn into the cavities 204, 206, 208 via the vacuum 218 and vacuum ports 216.

As shown in FIG. 9, forming the sheet of material 202 such that the material 202 is drawn into the cavities 204, 206, 208 forms the respective compartments 100, 102, 104 of the cushioning member 36. Specifically, the material of the sheet of material 202 engages the arcuate surfaces 210, 212, 214 to form the sheet of material 202 into the various compartments 100, 102, 104 of the cushioning member 36. The heat and pressure applied to the sheet of material 202 (i.e. by the vacuum (218) and the internal heat source and/or the external heat source) causes the sheet of material 202 to conform generally to the shape of the tool 200 at the cavities 204, 206, 208, thereby forming the first barrier member 94 of the cushioning member 36. Once the sheet of material 202 is formed into the shape of the first barrier member 94, the material of the first barrier member 94 is permitted to cool, thereby causing the material of the first barrier member 94 to retain the shape of the tool 200, as defined by the arcuate surfaces 210, 212, 214 of the cavities 204, 206, 208, respectively.

Once the sheet of material 202 is formed into the shape of the first barrier member 94, as described above, the compartments 100, 102, 104 may be filled with particulate matter 98. As described above, the particulate matter 98 may include foam beads having the same and/or different shapes to provide the cushioning member 36 with the ability to provide cushioning for the article of footwear 10 once the second barrier member 96 is attached to the first barrier member 94 and the cushioning member 36 is inserted in the midsole 32.

Figure 10:
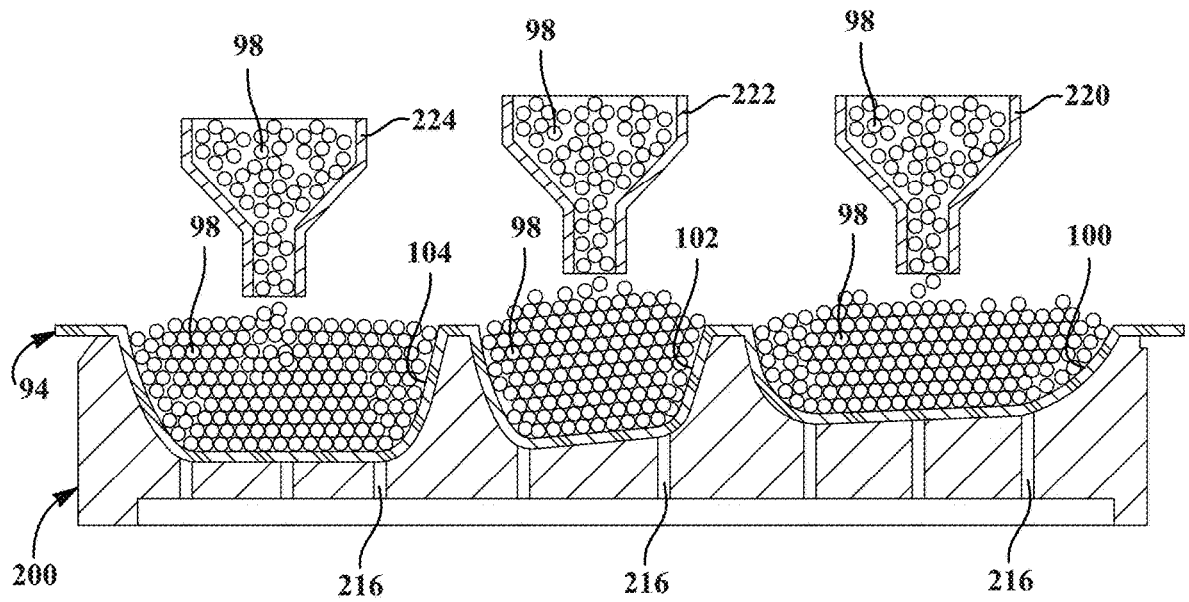
FIG. 10 is a cross-sectional view of the tool of FIG. 8 and the barrier member of FIG. 9 showing the barrier member receiving quantities of particulate matter.

The particulate matter 98 may be inserted into the compartments 100, 102, 104, by depositing the particulate matter 98 into each compartment 100, 102, 104 via a series of hoppers (FIG. 10). Specifically, a first hopper 220 may be aligned with the first compartment 100, a second hopper 222 may be aligned with the second compartment 102, and a third hopper 224 may be aligned with the third compartment 104 such that when the hoppers 220, 222, 224 release particulate matter 98, the particulate matter 98 is received by the respective compartments 100, 102, 104. In one configuration, the hoppers 220, 222, 224 may be gravity fed such that when a valve or other metering device (none shown) associated with the respective hoppers 220, 222, 224 is open, particulate matter 98 disposed within the hoppers 220, 222, 224 is automatically dispensed from the hoppers 220, 222, 224 and is received by the compartments 100, 102, 104 of the first barrier member 94. Once a predetermined quantity of particulate matter 98 is received by the first compartment 100, the second compartment 102, and the third compartment 104, the valves associated with the hoppers 220, 222, 224 may be closed to prevent further particulate matter 98 from being received by any of the compartments 100, 102, 104.

Figure 11:
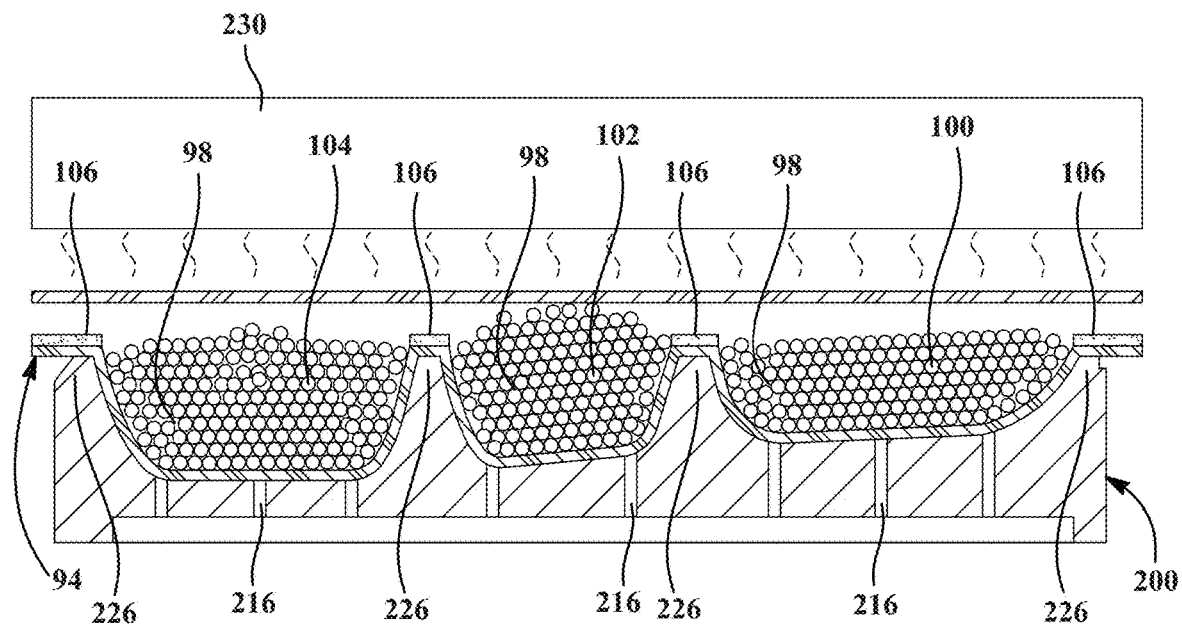
FIG. 11 is a cross-sectional view of the tool of FIG. 8 showing the barrier member of FIG. 9 being secured to another barrier member.

With particular reference to FIG. 11, the compartments 100, 102, 104 are shown as being substantially filled with particulate matter 98. At this point, the adhesive 106 may be applied at regions surrounding the compartments 100, 102, 104 to allow the first barrier member 94 to be attached to the second barrier member 96. As described above, and in one configuration, the adhesive 106 may be a hot melt adhesive. The hot melt adhesive may be placed on the first barrier member 94 at areas surrounding the compartments 100, 102, 104 and at raised portions 226 of the tool 200. The raised portions 226 may generally mimic a shape of the first wall 90 and the second wall 92 of the midsole 32 to allow the cushioning member 36 to be matingly received by the cavities 54, 56, 58 of the midsole 32, as shown in FIG. 3.

Once the adhesive 106 is disposed on the first barrier member 94 in areas surrounding the first compartment 100, the second compartment 102, and the third compartment 104, a sheet of material 228 may be placed between the first barrier member 94 and a heat source 230. The sheet of material 228 may be positioned on the adhesive 106 such that the sheet of material 228 opposes and covers the first compartment 100, the second compartment 102, and the third compartment 104. Once the sheet of material 228 is properly placed relative to the first barrier member 94, the heat source 230 may be activated, thereby causing the adhesive 106 to bond with the sheet of material 228 and seal the first compartment 100, the second compartment 102, and the third compartment 104.

Figure 12:
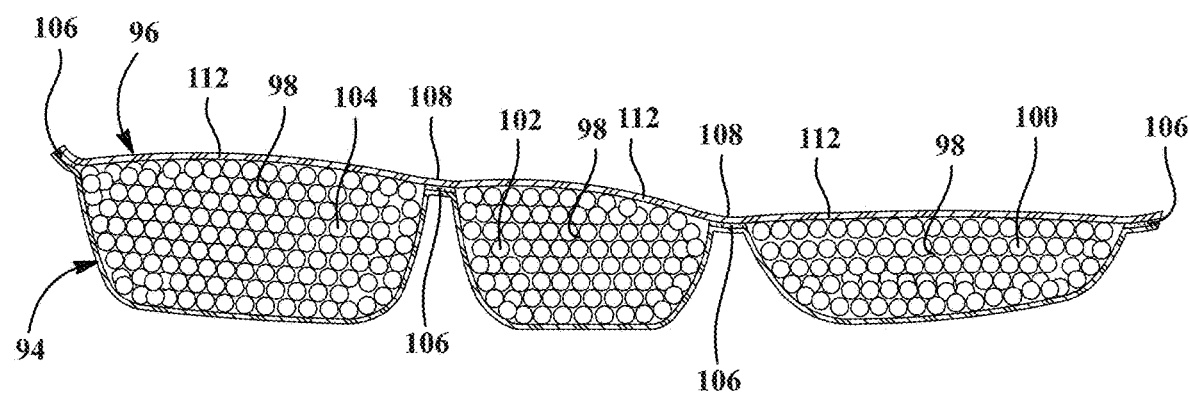
FIG. 12 is a cross-sectional view of a formed cushioning member in accordance with the principals of the present disclosure.

Once the sheet of material 228 is attached to the first barrier member 94, the sheet of material 228 closes the first compartment 100, the second compartment 102, and the third compartment 104 and, thus, forms the second barrier member 96. As shown in FIG. 12, the second barrier member 96 may define bulges 112 depending on the quantity of the particulate matter 98 disposed within the respective compartments 100, 102, 104, as described above. Regardless of the quantity of particulate matter 98 received by the respective compartments 100, 102, 104, once the sheet of material 228 is attached to the first barrier member 94 and, thus, forms the second barrier member 96, the cushioning member 36 may be inserted into the midsole 32 such that the first compartment 100 is received by the ball cavity 54 of the midsole 32, the second compartment 102 is received by the mid-foot cavity 56 of the midsole 32, and the third compartment 104 is received by the heel cavity 58 of the midsole 32.

As described above, the cushioning member 36 may be formed via a thermoforming process. In so doing, the first compartment 100, the second compartment 102, and the third compartment 104 receive a predetermined quantity of particulate matter 98 and, further, may result in the second barrier member 96 forming bulges 112 at an outer surface 110 that opposes the substrate 38 once installed in the article of footwear 10. While the quantity of particulate matter 98 disposed within the first compartment 100, the second compartment 102, and/or the third compartment 104 may result in one or more bulges 112 being formed at the second barrier member 96, the bulges 112 are limited by the amount of particulate matter 98 that can be deposited in the various compartments 100, 102, 104 via the hoppers 220, 222, 224 without having the particulate matter 98 spill over edges of the first barrier member 94. Accordingly, the degree to which the bulges 112 extend from the cushioning member 36 is limited to the quantity of particulate matter 98 that can be stacked in the compartments 100, 102, 104 without the particulate matter 98 spilling over edges of the first barrier member 94.

The bulges 112 could be increased by first attaching the second barrier member 96 to the first barrier member 94, thereby closing the compartments 100, 102, 104 prior to insertion of the particulate matter 98 into the compartments 100, 102, 104. Inserting the particulate matter 98 into the compartments 100, 102, 104 after the second barrier member 96 is attached to the first barrier member 94 requires use of a different process than the thermoforming process described above.

As will be described in greater detail below, a compression molding process could be used in place of the thermoforming process in an effort to first join the second barrier member 96 to the first barrier member 94 before inserting the particulate matter 98 into the compartments 100, 102, 104. First attaching the second barrier member 96 to the first barrier member 94 before filling the compartments 100, 102, 104 with particulate matter 98 allows one or more of the compartments 100, 102, 104 to be overfilled with particulate matter 98 relative to the amount of particulate matter 98 capable of being inserted into the compartments 100, 102, 104 when the cushioning member 36 is formed via the thermoforming process described above and shown in FIGS. 8-11.

With reference to FIGS. 14-24, a compression molding process for use in making the cushioning member 36 will be described in detail.

The compression molding process may utilize a mold 300 including an upper mold half 302 and a lower mold half 304. The lower mold half 304 may include a ball cavity 308, a mid-foot cavity 310, and a heel cavity 312. The ball cavity 308 may include an arcuate surface 314 used to form the first compartment 100 of the first barrier member 94. Similarly, the mid-foot cavity 310 may include an arcuate surface 316 used to form the second compartment 102 of the first barrier member 94 and the heel cavity 312 may include an arcuate surface 318 used to form the third compartment 104 of the first barrier member 94. The cavities 308, 310, 312 and associated arcuate surfaces 314, 316, 318 may be identical to the cavities 204, 206, 208 and arcuate surfaces 210, 212, 214, respectively, of the tool 200 used to form the first barrier member 94 via the thermoforming process shown in FIGS. 8-11.

The upper mold half 302 may include projections that extend into the respective cavities 308, 310, 312. Specifically, the upper mold half 302 may include a first projection 320, a second projection 322, and a third projection 324 that are respectively received by the ball cavity 308, the mid-foot cavity 310, and the heel cavity 312. The projections 320, 322, 324 may mimic a shape of the respective arcuate surfaces 314, 316, 318 and may be spaced apart from the arcuate surfaces 314, 316, 318 by a thickness of a sheet of TPU material used to form the first barrier member 94, as will be described in greater detail below.

In operation, a sheet of material 306 such as a sheet of TPU material may be inserted between the upper mold half 302 and the lower mold half 304. The sheet of material 306 may be attached to the lower mold half 304 via a pair of posts 326 extending from the lower mold half 304 and through a portion of the sheet of material 306.

Figure 15:
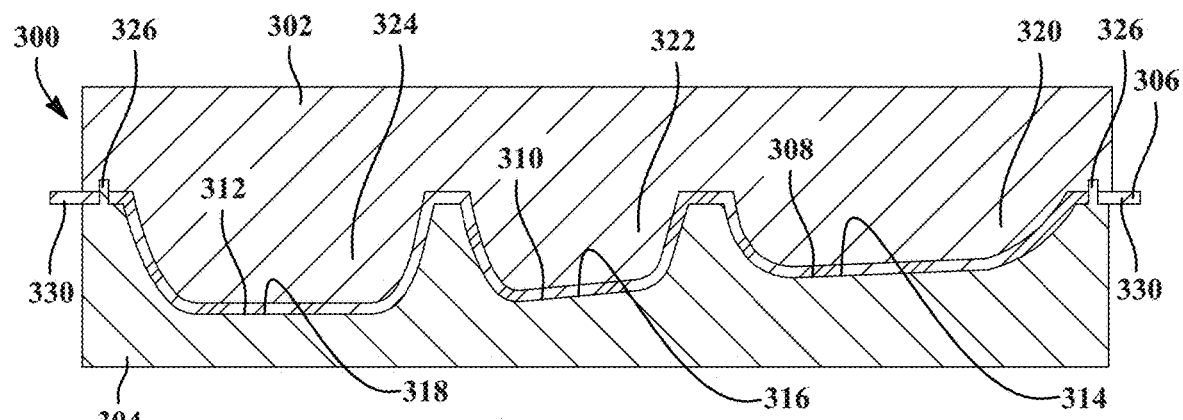
FIG. 15 is a cross-sectional view of the tool of FIG. 10 shown in a closed state and forming the sheet of material into a partially formed barrier member of the cushioning member.

Once the sheet of material 306 is disposed between the upper mold half 302 and the lower mold half 304 (FIG. 14), the mold halves 302, 304 may be brought towards one another or, alternatively, one of the mold halves 302, 304 may be moved toward the other of the mold halves 302, 304 until the mold halves 302, 304 are moved into the position shown in FIG. 15. Namely, the upper mold half 302 and/or the lower mold half 304 may be moved from the position shown in FIG. 14 to the position shown in FIG. 15 to form the sheet of material 306 from a substantially plainer shape (FIG. 14) to the shape of the first barrier member 94 (FIG. 15). When the mold halves 302, 304 are positioned in the configuration shown in FIG. 15, the posts 326 may be received within respective apertures 328 of the upper mold half 302, thereby defining a relative spacing between the upper mold half 302 and the lower mold half 304. In one configuration, the spacing is approximately equal to a thickness of the sheet of material 306 to prevent compression of the sheet of material 306 between the projections 320, 322, 324 and the respective arcuate surfaces 314, 316, 318 of the cavities 308, 310, 312.

Engaging the sheet of material 306 with the posts 326 maintains a position of the sheet of material 306 at the posts 326 relative to the lower mold half 304. Accordingly, when the upper mold half 302 engages the sheet of material 306 at the projections 320, 322, 324, the material of the sheet of material 306 is stretched and formed into the shape defined by the arcuate surfaces 314, 316, 318. Deformation of the sheet of material 306 by the upper mold half 302 forms the sheet of material 306 into the shape shown in FIG. 16.

Figure 16:
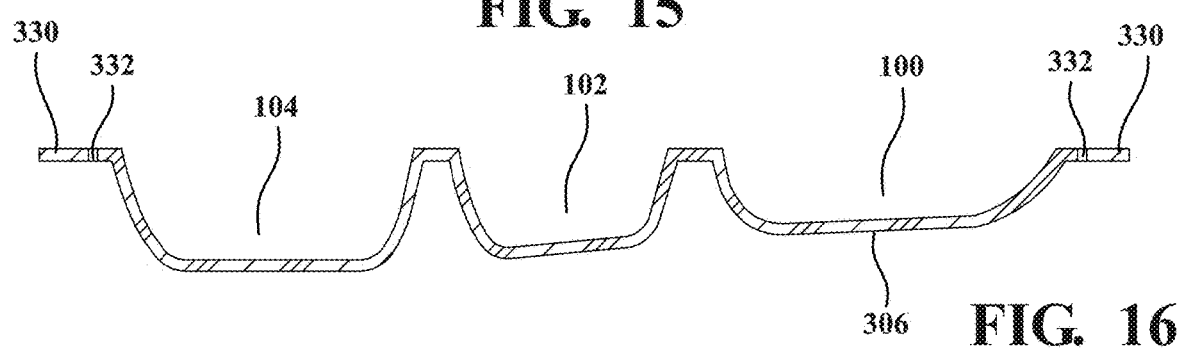
FIG. 16 is a cross-sectional view of the partially formed barrier member of FIG. 15.

As shown in FIG. 12, the sheet of material 306 is formed into a shape that defines the compartments 100, 102, 104 but includes additional material at the location where the posts 326 engage the sheet of material 306 relative to the shape of the first barrier member 94 shown in FIG. 9. Accordingly, the sheet of material 306 depicted in FIG. 16 is a partially formed first barrier member 94. The additional material defines a flange 330 that extends generally around a perimeter of the sheet of material 306 and surrounds the compartments 100, 102, 104 formed by the mold 300. The flange 330 may additionally include a pair of apertures 332 formed by the posts 326 during formation of the sheet of material 306 into the configuration shown in FIG. 16. As will be described in greater detail below, the flange along with the apertures 332 may be removed from the sheet of material 306 to form the first barrier member 94 via a die-cutting process, for example.

Figure 17:
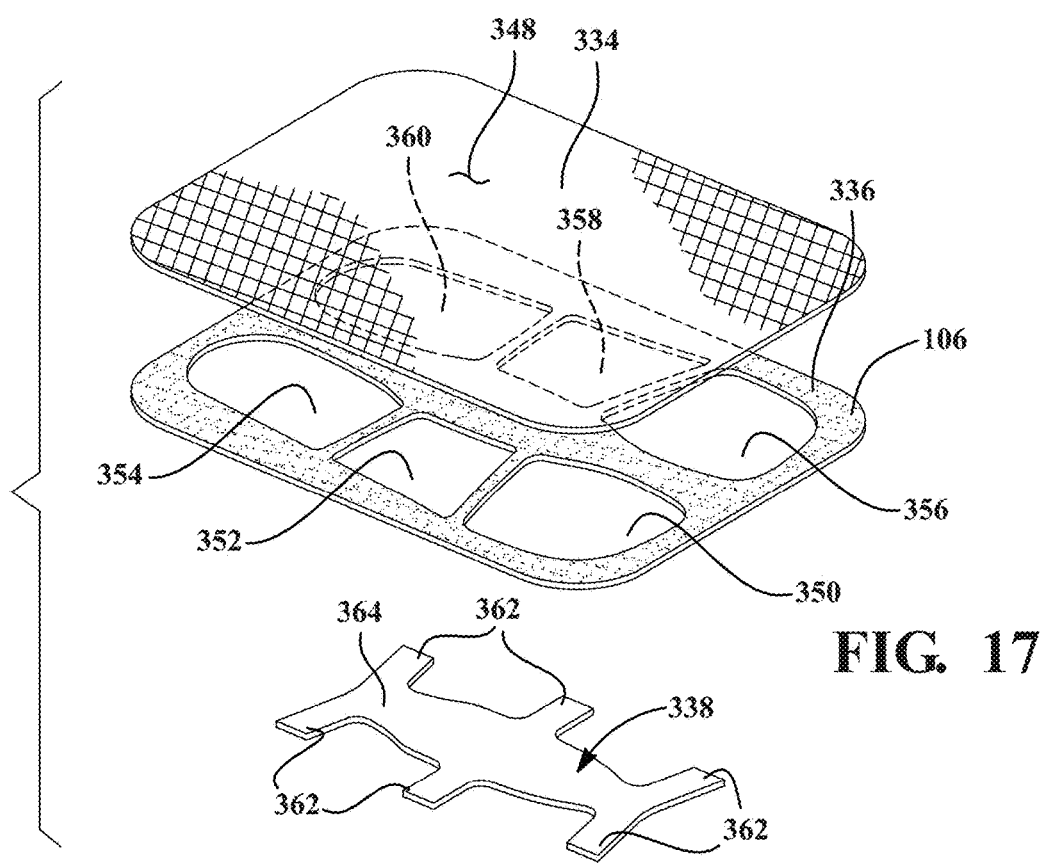
FIG. 17 is an exploded view of another barrier member shown in conjunction with a sheet of adhesive material and a blocking member.

Once the sheet of material 306 is formed into the configuration shown in FIG. 16, a sheet of material 334 used to form the second barrier member 96 may be attached to sheet of material 306. As described above, the second barrier member 96 may be formed from a flexible material such as spandex. Further, the second barrier member 96 is described as being attached to the first barrier member 94 via an adhesive 106. As shown in FIG. 17, the adhesive 106 may be provided in the form of a sheet of adhesive material 336 such as, for example, a sheet of hot melt adhesive. Finally, a blocking element 338 may be positioned between the adhesive 106 and the sheet of material 306 that forms the first barrier member 94 to form areas between the adhesive 106 and the first barrier member 94 that are not joined. Forming areas between the adhesive 106 and the first barrier member 94 that are not joined likewise forms areas between the first barrier member 94 and the second barrier member 96 that are not joined. As will be described in greater detail below, the areas where the first barrier member 94 is separated from the second barrier member 96 via the blocking element 338 provides an area where particulate matter 98 is permitted to be inserted into the first compartment 100, the second compartment 102, and the third compartment 104.

The sheet of material 306 may be placed in a tool 340 (FIG. 14) that generally conforms to the shape of the first material 306 after formation of the sheet of material 306 into the configuration shown in FIG. 16. The tool 340 may be identical to the tool 200 described above with respect to the thermoforming process. Alternatively, the tool 340 may be identical to the tool 200 with the exception of the tool 340 failing to include the vacuum ports 216 associated with the tool 200. Regardless of the particular configuration of the tool 340, the tool 340 may include a forefoot cavity 342, a mid-foot cavity 344, and a heel cavity 346 that respectively receive the first compartment 100, the second compartment 102, and the third compartment 104 defined by the sheet of material 306 after formation by the mold 300.

After the sheet of material 306 is inserted into the tool 340 such that the first compartment 100 is received by the forefoot cavity 342, the second compartment 102 is received by the mid-foot cavity 344, and the third compartment 104 is received by the heel cavity 346, the blocking element 338 may be positioned over the sheet of material 306, the sheet of adhesive material 336 may be placed on the blocking element 338, and the sheet of material 334 forming the second barrier member 96 may be placed on top of the sheet of adhesive 336. Accordingly, the blocking element 338 is disposed between the sheet of adhesive 336 and the sheet of material 306 forming the first barrier member 94, the sheet of adhesive 336 is disposed between the sheet of material 334 forming the second barrier member 96 and the blocking element 338, and the sheet of material 334 that forms the second barrier member 96 is disposed on the sheet of adhesive material 336 and includes an exposed outer surface 348.

With particular reference to FIG. 17, the sheet of adhesive is shown as including a first aperture 350, a second aperture 352, and a third aperture 354. The first aperture 350 includes a shape that corresponds to a shape of the first compartment 100 to allow the adhesive 106 to completely surround the first compartment 100. Similarly, the second aperture 352 includes a shape that corresponds to a shape of the second compartment 102 to allow the adhesive 106 of the sheet of adhesive material 336 to completely surround the second compartment 102 while the third aperture 354 includes a shape that corresponds to a shape of the third compartment 104 to allow the adhesive 106 of the sheet of adhesive material 336 to completely surround the third compartment 104.

The sheet of adhesive material 336 may additionally include a fourth aperture 356, a fifth aperture 358, and a sixth aperture 360. The fourth aperture 356, the fifth aperture 358, and the sixth aperture 360 may respectively correspond to a first compartment 100, a second compartment 102, and a third compartment 104 of a first barrier member 94 of an additional cushioning member 36. For example, the sheet of adhesive material 336 may be used to simultaneously form a pair of cushioning members 36. As shown in FIG. 17, the sheet of adhesive material 336 and the related apertures 350, 352, 354, 356, 358, 360 are sized and positioned to accommodate cushioning members 36 for use with different articles of footwear 10. Namely, the apertures 350, 352, 354 are used to form a cushioning member 36 for use with a right-foot article of footwear 10 while the apertures 356, 358, 360 are used to form a cushioning member 36 for use with a left-foot article of footwear 10. While the sheet of adhesive material 336 and the related apertures 350-360 are described and shown as being used to form a cushioning member 36 for use with a right-foot article of footwear 10 and a cushioning member 36 for use with a left-foot article of footwear 10, respectively, the apertures 350-360 could be formed through the sheet of adhesive material 336 and positioned such that a pair of cushioning members 36 having the same configuration are formed. Namely, a pair of cushioning members 36 could be formed for use with a right-foot article of footwear 10 or, alternatively, a pair of cushioning members 36 could be formed for use with a left-foot article of footwear 10.

Finally, while a pair of cushioning members 36 are described as being formed simultaneously via the sheet of adhesive material 336, the sheet of adhesive material 336 could only include three apertures total such that only one cushioning member 36 is formed. Namely, the sheet of adhesive material 336 could include apertures 350, 352, 354 for use in making a cushioning member 36 for a right-foot article of footwear 10 or, alternatively could only include apertures 356, 358, 360 for use in making a cushioning member 36 for use with a left-foot article of footwear 10. While the sheet of adhesive material 336 could be used to form a pair of cushioning members 36 for the same or different footed articles of footwear or, alternatively, could be configured for making a single cushioning member 36, the sheet of adhesive material 336 will be described and shown hereinafter as including six apertures 350-360 that are used to form a pair of cushioning members 36 that are respectively configured for use in a right-foot article of footwear 10 and a left-foot article of footwear 10.

While not specifically shown, the tool 340 could include two sets of cavities 342, 344, 346 that respectively receive portions of the same sheet of material 306 or individual sheets of material 306 to position the compartments 100, 102, 104 relative to the apertures of the sheet of adhesive material 336. In this manner, the tool 340 could support a pair of first compartments 100, a pair of second compartments 102, and a pair of third compartments 104 of the same or different sheets of material 306 relative to the sheet of adhesive material 336 to simultaneously join the pairs of compartments 100, 102, 104 to the sheet of material 334 via the adhesive 106.

The blocking element 338 may be formed from a material that resists bonding to the adhesive 106 of the sheet of adhesive material 336. For example, the blocking element 338 may be formed from Kevlar® that inhibits bonding between the adhesive 106 of the sheet of adhesive material 336 and the sheet of material 306 that forms the first barrier member 94.

Regardless of the material used to form the blocking element 338, the blocking element 338 may include a series of projections 362 extending from a main body 364. The projections 362 may be disposed along a length of the main body 364 such that each projection 362 is aligned with a respective aperture 350-360 of the sheet of adhesive material 336.

As described, the sheet of adhesive material 336 is positioned such that the apertures 350-360 are aligned with respective compartments 100, 102, 104 formed by one or more sheets of material 306 to simultaneously form a pair of cushioning members 36. Accordingly, aligning the projections 362 with the apertures 350-360 such that one projection 362 is aligned with each of the respective apertures 350-360 likewise aligns the projections 362 with the compartments 100, 102, 104 of a pair of first barrier members 94 used to form a pair of cushioning members 36. Accordingly, when the blocking element 338 is disposed between the sheet of adhesive material 336 and the sheet(s) of material 306 forming the first barrier members 94, the blocking element 338 is positioned such that the projections 362 are respectively aligned with the compartments 100, 102, 104 of each barrier member 94.

Once the blocking element 338, the sheet of adhesive material 336, and the sheet of material 334 forming the second barrier members 96 are stacked on the sheet(s) of material 306 forming the first barrier members 94, a heating device 366 may be used to apply heat to surface 348. Heating the sheet of material 334 that forms the second barrier members 96 activates the adhesive 106 of the sheet of adhesive material 336, thereby bonding the sheet of material 334 forming the second barrier members 96 to the sheet of material 306 forming the first barrier members 94 at every location with the exception of the locations of the blocking element 338. Namely, the sheet of adhesive material 336 is not bonded to the sheet(s) of material 306 forming the first barrier members 94 at the location of the projections 362 and the main body 364 of the blocking element 338.

Figure 19:
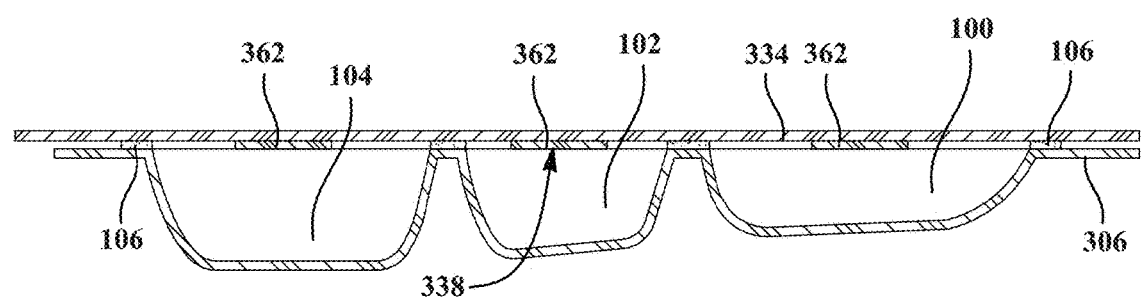
FIG. 19 is a cross-sectional view of a partially formed, prefilled cushioning member.

Once the sheet of material 334 that forms the second barrier members 96 is attached to the sheet(s) of material 306 that forms the first barrier members 94, the assembly includes the configuration shown in FIG. 19. At this point, the sheet of material 334 forming the second barrier members 96 is attached to the sheet(s) of material 306 forming the first barrier members 94 but does not include particulate matter 98. As such, the configuration shown in FIG. 19 is a pre-filled barrier member devoid of particulate matter 98.

Figure 20:
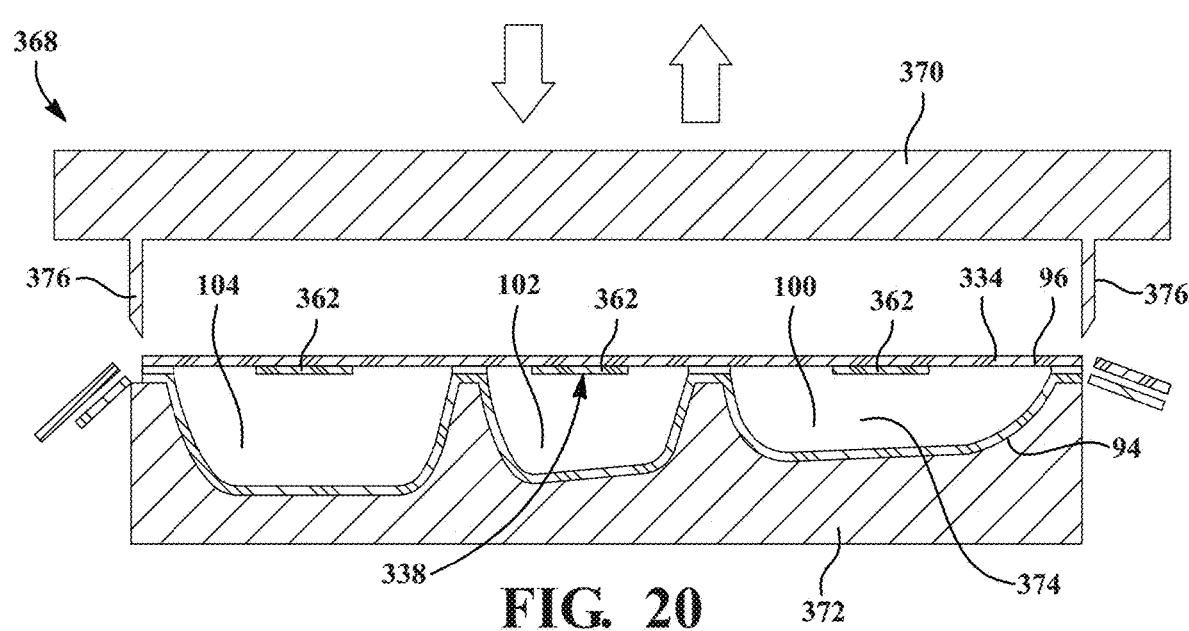
FIG. 20 is a cross-sectional view of a die-cutting tool used to form the partially formed, pre-filled cushioning member of FIG. 19 into a desired shape.
Figure 21:
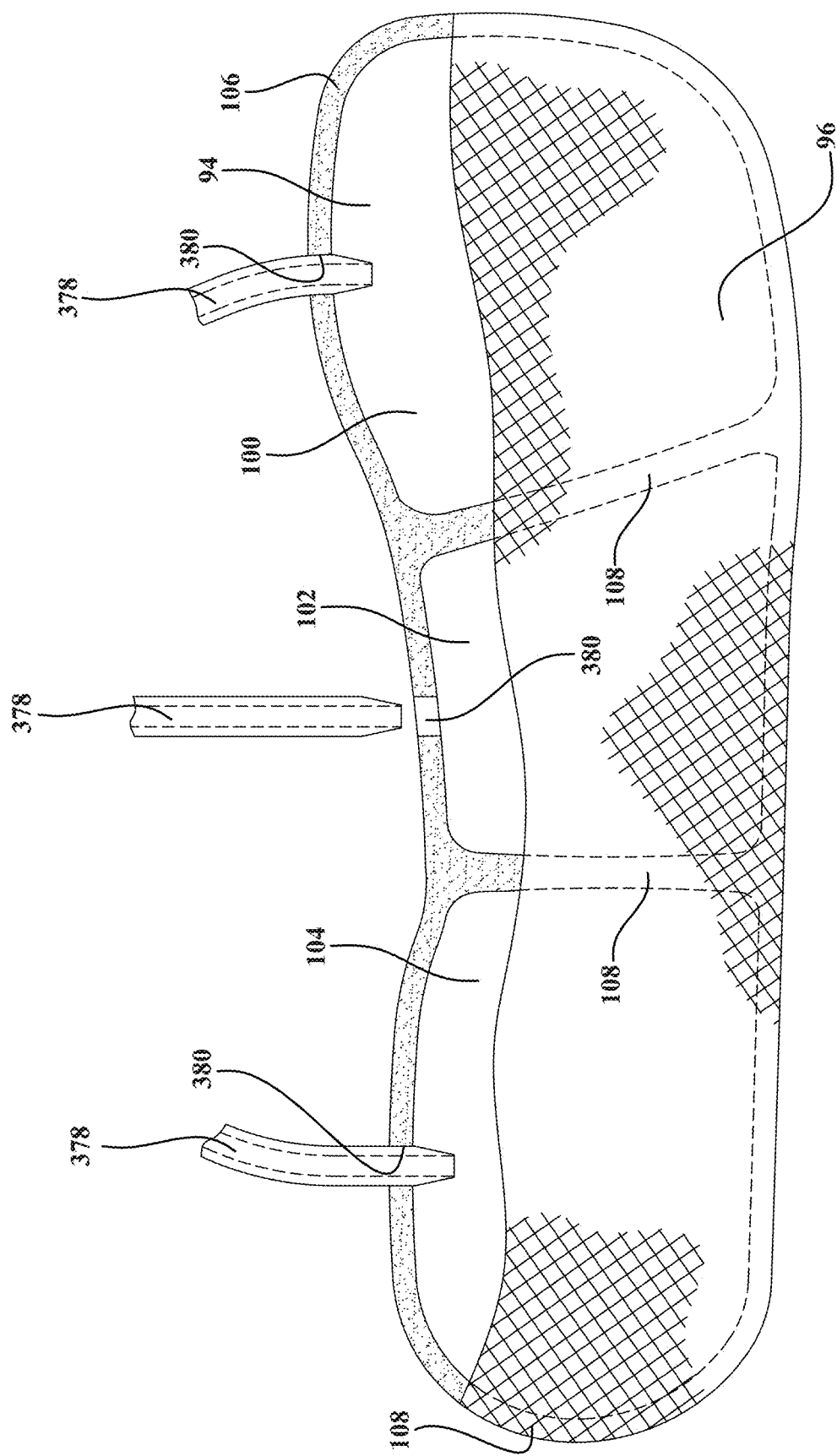
FIG. 21 is a top view of the pre-filled cushioning member of FIG. 19 showing ports that receive an injection nozzle.
Figure 22:
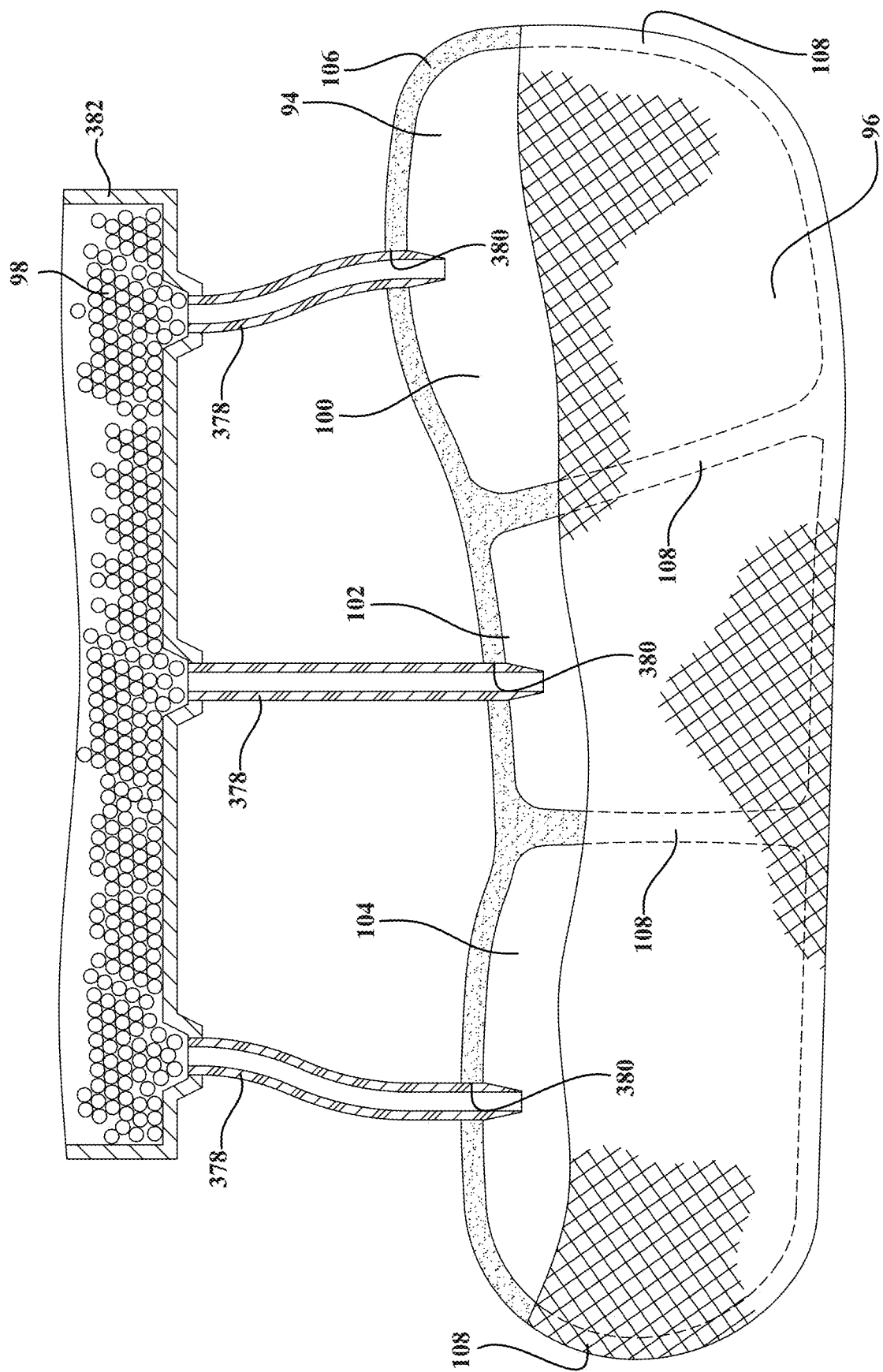
FIG. 22 is a top view of the pre-filled cushioning member of FIG. 19 showing the ports of FIG. 21 receiving respective nozzles of a filling device.
Figure 23:
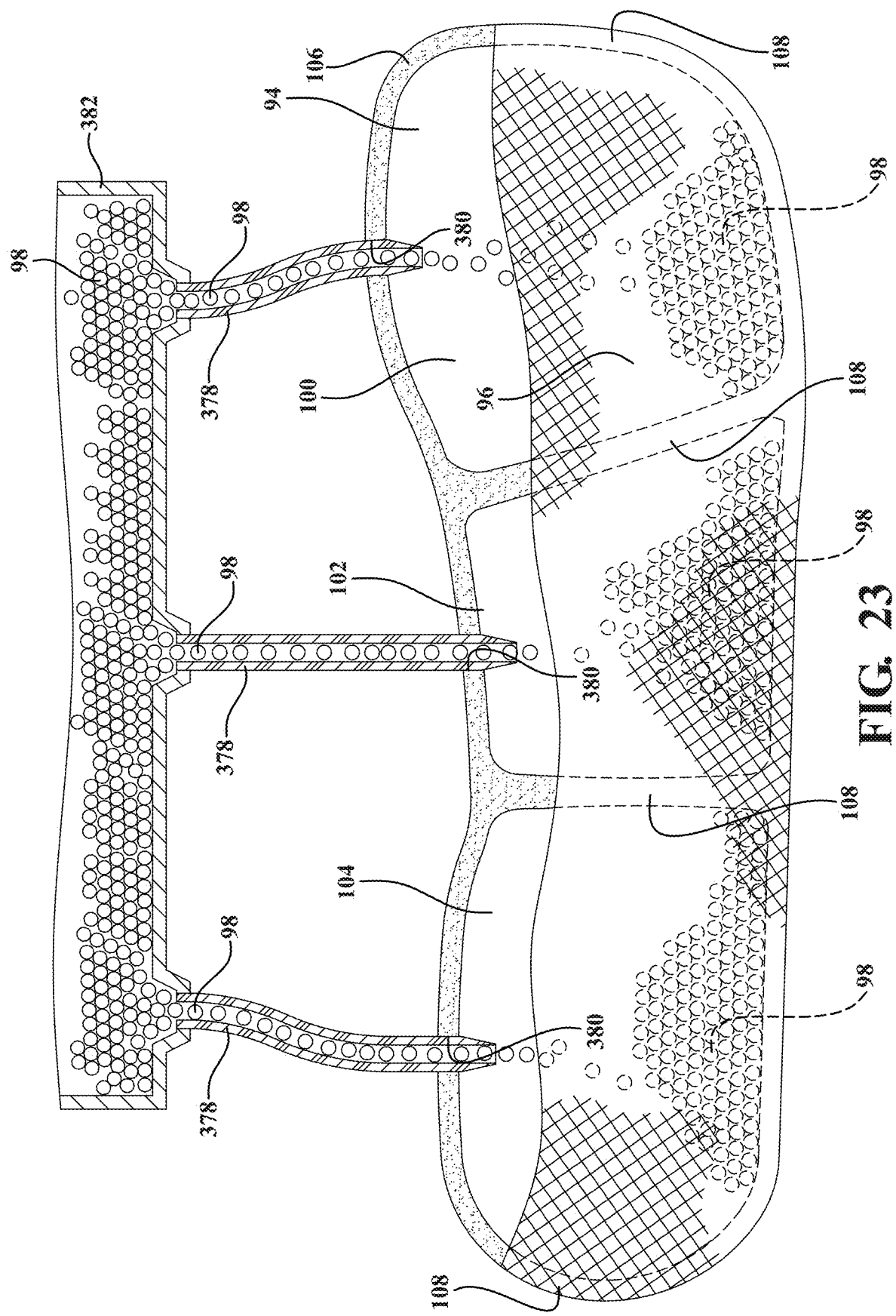
FIG. 23 is a top view of the pre-filled cushioning member of FIG. 19 showing the nozzles of FIG. 22 inserting particulate matter into chambers of the pre-filled cushioning member.

As described above with respect to FIG. 17, the sheet of adhesive material 336 and blocking element 338 are used to form a pair of cushioning members 36. The pair of cushioning members 36 may be separated from one another and formed into the shape of the cushioning member 36 shown above with respect to FIG. 13 by subjecting the sheet of material 334 forming the pair of second barrier members 96 and the sheet(s) of material 306 forming the first barrier members 94 to a die-cutting process, as shown in FIG. 20. Namely, the joined sheets of material 306, 334 may be inserted into a die-cutting tool 368 having an upper die 370 and a lower die 372. Specifically, the configuration shown in FIG. 19 may be inserted into a cavity 374 of the lower mold 372 to properly position the joined sheets of material 306, 334 relative to a cutting mechanism 376 associated with the upper die 370. While not specifically illustrated, the cutting mechanism 376 includes a shape defining the outer perimeter of the cushioning member 36 shown in FIG. 13. Further, while only one cutting mechanism 376 is shown in cross-section in FIG. 19, a pair of cutting mechanisms 376 could be used if a pair of cushioning members 36 are being simultaneously cut from the joined sheets of material 306, 334.

Figure 13:
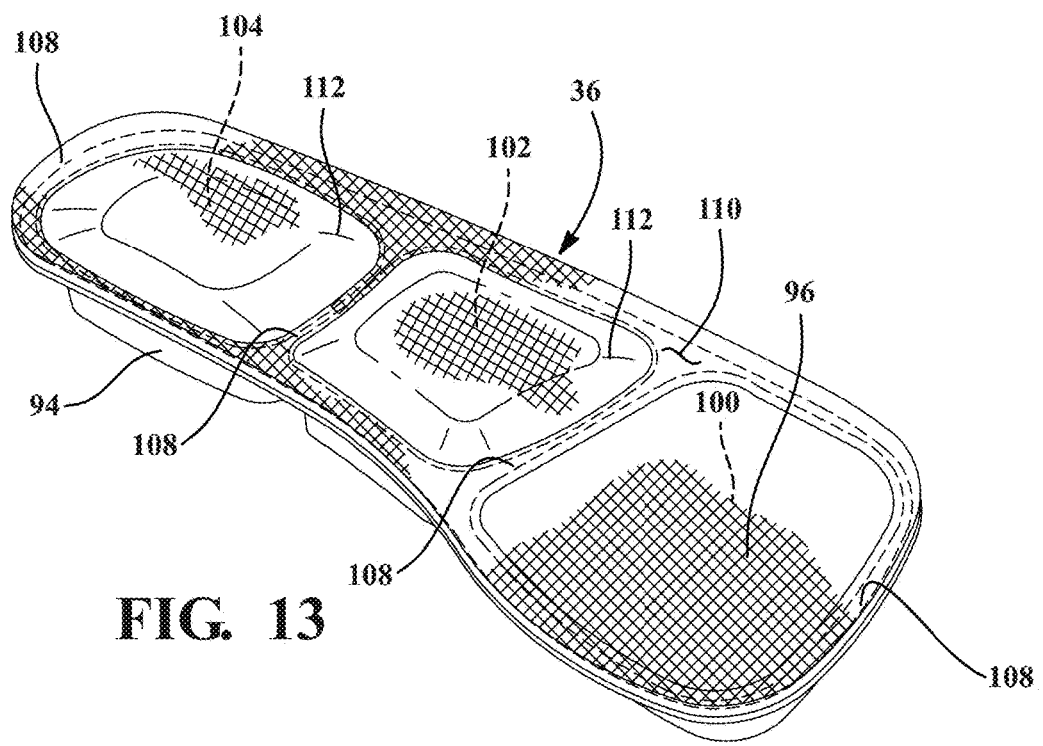
FIG. 13 is a perspective view of the cushioning member of FIG. 12.
Figure 14:
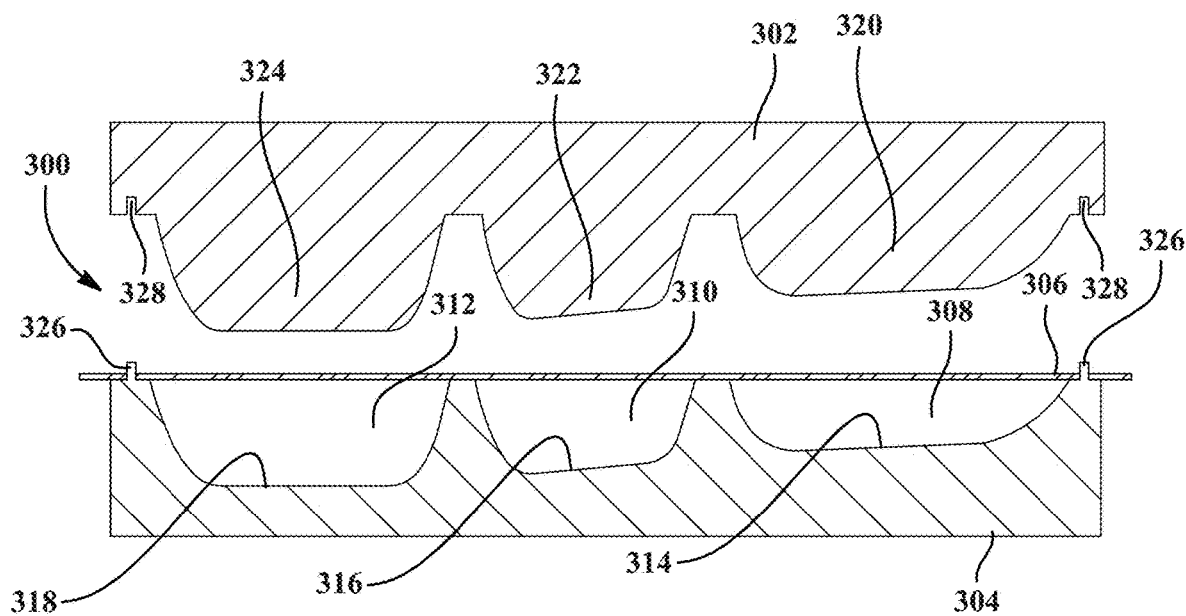
FIG. 14 is a cross-sectional view of a tool for use in forming the cushioning member of FIG. 3 with halves of the tool open and receiving a sheet of material.

In operation, when the upper die 370 and, thus, the cutting mechanism(s) 376, are translated toward the lower die 372, the cutting mechanism 376 engages an outer perimeter of the joined sheets of material 306, 334, thereby separating the pre-filled cushioning members 36 from one another and forming the pre-filled cushioning members 36 into the shape shown in FIG. 13. At this point, the pair of pre-filled cushioning members 36 are separated from one another and may be filled with a predetermined quantity of particulate matter 98.

Figure 18:
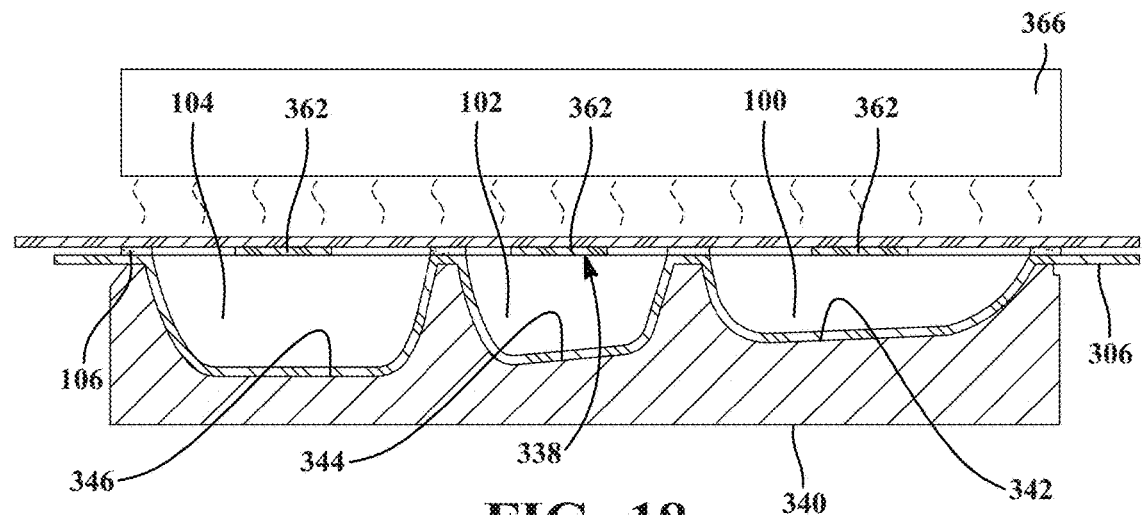
FIG. 18 is a cross-sectional view of a tool for use in joining the barrier member of FIG. 16 to the other barrier member of FIG. 17.

With particular reference to FIGS. 17-19, the compartments 100, 102, 104 are shown as receiving an injection nozzle 378 at respective ports 380 associated with the compartments 100, 102, 104. The ports 380 are formed at locations of the projections 362 of the blocking element 338. Namely, and as described above, the projections 262 prevent the adhesive material 106 of the sheet of adhesive material 336 from joining the second barrier member 96 to the first barrier member 94 at the locations of the projections 362. Accordingly, the ports 380 are formed at the locations of the projections 362 of the blocking element 338, thereby allowing the nozzles 378 to be inserted into the respective compartments 100, 102, 104.

In operation, the nozzles 378 are inserted into the respective ports 380 of the compartments 100, 102, 104 and are in fluid communication with the interiors of the compartments 100, 102, 104. Note that the views shown in FIGS. 17-19 are partial cut-away views, whereby a portion of the second barrier member 96 is removed to show the first compartment 100, the second compartment 102, and the third compartment 104 of the first barrier member 94.

Once the nozzles 378 are disposed within the ports 380 such that the nozzles 378 are disposed between the second barrier member 96 and the first barrier member 94, particulate matter 98 may be injected into the nozzles 378 via fluid pressure. For example, air pressure may be used to direct particulate matter 98 disposed within a hopper 382 (FIG. 22) into the nozzles 378. While the nozzles 378 are described and shown as being associated with a common hopper 382, the nozzles 378 could alternatively be associated with individual hoppers that supply the nozzles 378 with particulate matter 98.

As shown in FIGS. 17-19, the nozzles 378 may include an inner diameter that is substantially equal to an outer diameter of the particulate matter 98 or, alternatively, is slightly larger than the outer diameter of the particulate matter 98 to prevent bunching and clogging of the particulate matter 98 within the nozzles 378. The particulate matter 98 may be injected into the compartments 100, 102, 104 via the nozzles 378 and, further, because the particulate matter 98 is injected under fluid pressure such as air pressure, the particulate matter 98 disposed within the compartments 100, 102, 104 may overfill one or more of the compartments 100, 102, 104. Accordingly, the compartments 100, 102, 104 may include a larger quantity of particulate matter 98 as compared to a quantity of particulate matter received within the compartments 100, 102, 104 when the compartments 100, 102, 104 are filled with particulate matter 98, as described above with respect to the thermoforming process of FIGS. 8-11. Namely, because the particulate matter 98 is injected into the compartments 100, 102, 104 under fluid pressure and, further, because the second barrier member 96 is attached to the first barrier member 94 and each barrier member 94, 96 is formed from a flexible material, the particulate matter 98 may be overfilled in each of the compartments 100, 102, 104, thereby resulting in a greater bulge 112 at one or more of the compartments 100, 102, 104. The bulges are shown in FIGS. 25 and 26 as extending from a surface of the second barrier member 96.

Figure 24:
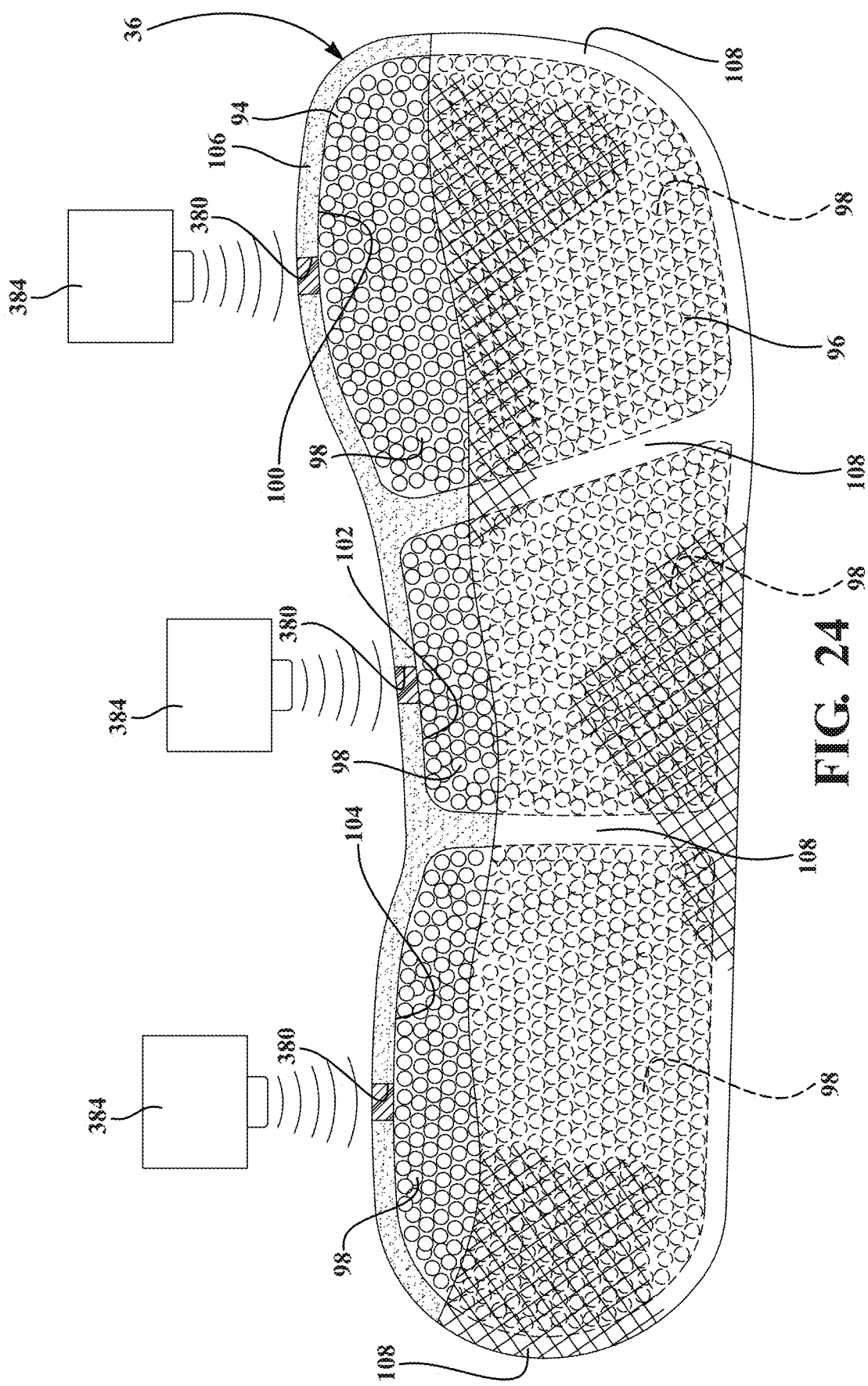
FIG. 24 is a top view of a cushioning member filed with particulate matter and being sealed via a welding process.

Once a desired quantity of particulate matter is disposed within each compartment 100, 102, 104, the ports 380 may be closed by joining the first barrier member 94 and the second barrier member 96 at the ports 380. For example, the first barrier member 94 and the second barrier member 96 may be locally subjected to a welding process such as radio frequency (RF) welding at each port location. As shown in FIG. 24, one or more welding apparatuses 384 may be used to join the first barrier member 94 and the second barrier member 96 at the location of the ports 380, thereby closing the ports 380 and containing the particulate matter 98 within the compartments 100, 102, 104.

Figure 25:
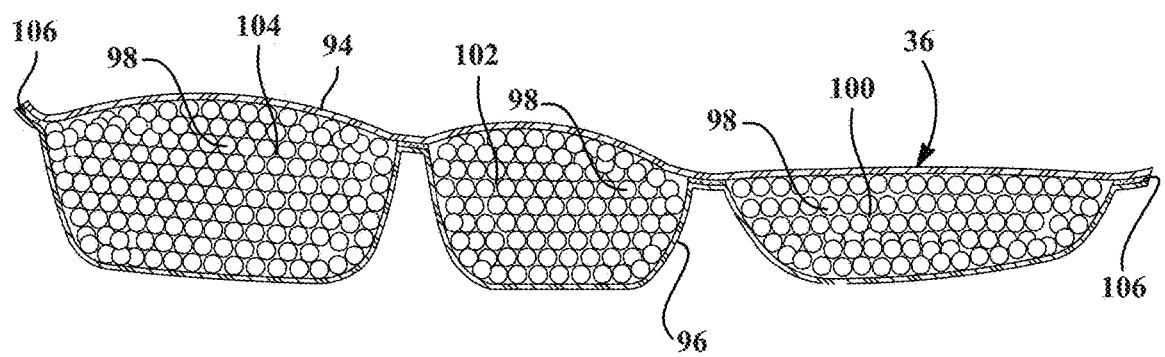
FIG. 25 is a cross-sectional view of the filled cushioning member of FIG. 24.
Figure 26:
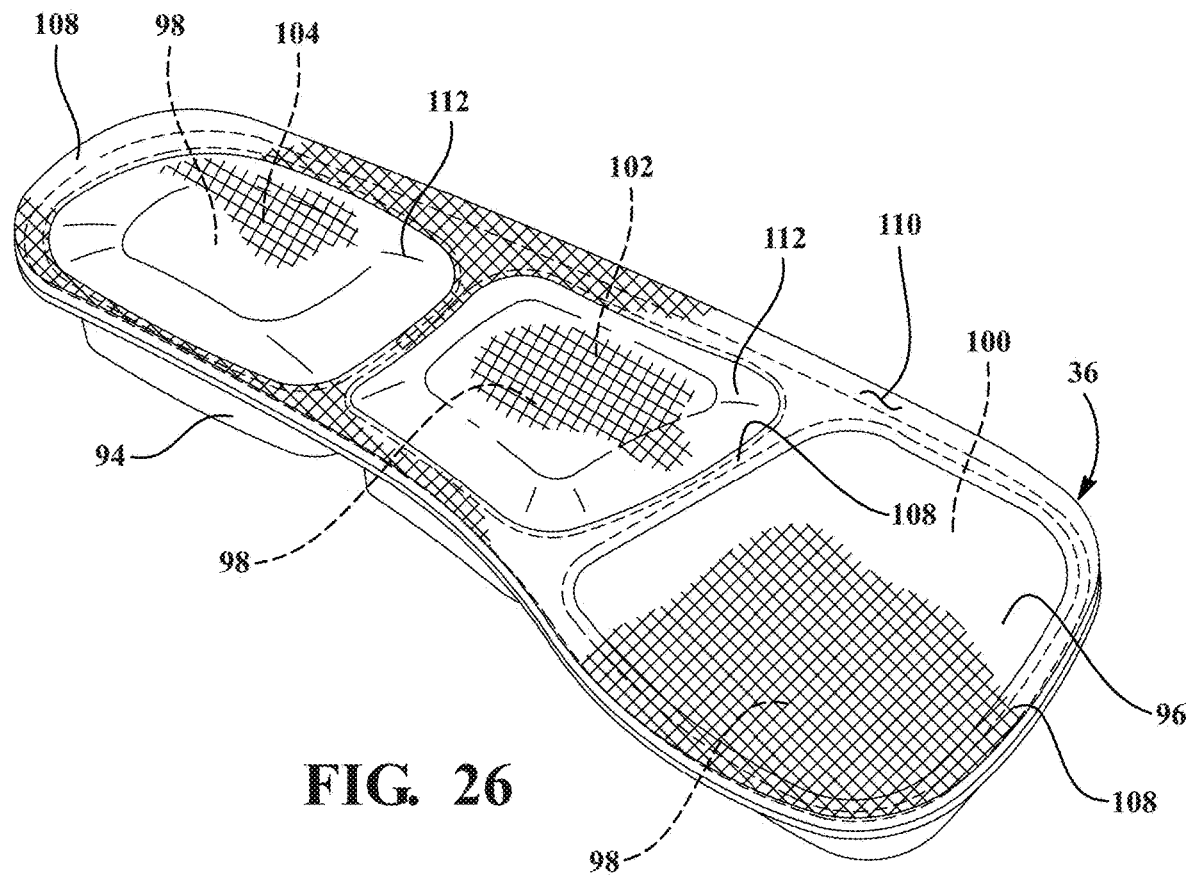
FIG. 26 is a perspective view of the cushioning member of FIG. 25.

As shown in FIGS. 25 and 26, a formed and filled cushioning member 36 is illustrated and includes a similar configuration as the cushioning member 36 formed via the thermoforming process described and shown above with respect to FIGS. 8-11. However, the cushioning members 36 shown in FIGS. 25 and 26 may include a greater quantity of particulate matter 98 in one or more of the compartments 100, 102, 104 and, thus, may include a greater bulge 112 at the second barrier member 96. Finally, the location of the ports 380 where RF welding is used to join the first barrier member 94 and the second barrier member 96 may be visible at the web member 108 when compared to the web member 108 formed via the thermoforming process of FIGS. 8-11.

The cushioning member 36 formed via the thermoforming process of FIGS. 8-11 or via the compression molding process of FIGS. 14-24, may be incorporated in the midsole 32, as shown in FIG. 27. Namely, the first compartment 100 may be aligned with the ball cavity 54 of the midsole 32, the second compartment 102 may be aligned with the mid-foot cavity 56 of the midsole 32, and the third compartment 104 may be aligned with the heel cavity 58 of the midsole 32 such that the compartments 100, 102, 104 are respectively received by the cavities 54, 56, 58. Once the cushioning member 36 is inserted into the midsole 32, the midsole 32 may be attached to the upper 12. At this point, the cushioning member 36 may be used to provide a degree of comfort and cushioning to a foot of a wearer during use of the article of footwear 10.

The following Clauses provide exemplary methods for making a cushioning member or a sole structure for an article of footwear, as described above.

Clause 1: A method of making a cushioning member comprising forming a first barrier member from a first material, the first barrier member including a first compartment and a second compartment, forming a second barrier member from a second material different than the first material, providing the first compartment with a first quantity of particulate matter, providing the second compartment with a second quantity of particulate matter, covering the first compartment with the second barrier member, and covering the second compartment with the second barrier member.

Clause 2: The method of Clause 1, wherein forming the first barrier member includes forming a sheet of the first material into a shape defining the first compartment and the second compartment.

Clause 3: The method of any of the preceding clauses, wherein forming the first barrier member from the first material includes forming the first barrier member from a polymer.

Clause 4: The method of any of the preceding clauses, wherein forming the first barrier member from the first material includes forming the first barrier member from thermoplastic polyurethane (TPU).

Clause 5: The method of any of the preceding clauses, wherein forming the second barrier member from the second material includes forming the second barrier member from spandex.

Clause 6: The method of Clause 1, wherein providing the first compartment with the first quantity of particulate matter includes providing the first compartment with a quantity of particulate matter that is approximately the same as the second quantity of particulate matter.

Clause 7: The method of Clause 1, wherein providing the first compartment with the first quantity of particulate matter includes providing the first compartment with a quantity of particulate matter that is different than the second quantity of particulate matter.

Clause 8: The method of any of the preceding clauses, wherein providing the first compartment with the first quantity of particulate matter and providing the second compartment with the second quantity of particulate matter includes providing the first compartment and the second compartment with foam beads.

Clause 9: The method of Clause 8, wherein providing the first compartment and the second compartment with foam beads includes providing foam beads having a substantially spherical shape.

Clause 10: The method of Clause 8, wherein providing the first compartment and the second compartment with foam beads includes providing foam beads having approximately the same size and shape.

Clause 11: The method of Clause 8, wherein providing the first compartment and the second compartment with foam beads includes providing foam beads having a different size and shape.

Clause 12: The method of Clause 1, wherein forming the first barrier member from the first material and forming the second barrier member from the second material includes forming one of the first barrier member and the second barrier member from a permeable material and forming the other of the first barrier member and the second barrier member from an impermeable material.

Clause 13: The method of Clause 1, wherein forming the first barrier member from the first material and forming the second barrier member from the second material includes forming the first barrier member from an impermeable material and forming the second barrier member from a permeable material.

Clause 14: The method of Clause 1, wherein providing the first compartment with the first quantity of particulate matter and providing the second compartment with the second quantity of particulate matter occurs before the first compartment and the second compartment are coved by the second barrier member.

Clause 15: The method of Clause 1, wherein providing the first compartment with the first quantity of particulate matter and providing the second compartment with the second quantity of particulate matter occurs after the first compartment and the second compartment are coved by the second barrier member.

Clause 16: The method of any of the preceding clauses, further comprising attaching the second barrier member to the first barrier member.

Clause 17: The method of Clause 16, wherein attaching the second barrier member to the first barrier member includes attaching the second barrier member to the first barrier member at a first attachment location that surrounds the first compartment and includes attaching the second barrier member to the first barrier member at a second attachment location that surrounds the second compartment.

Clause 18: The method of Clause 16, wherein attaching the second barrier member to the first barrier member includes attaching the second barrier member to the first barrier member via an adhesive.

Clause 19: The method of Clause 18, wherein attaching the second barrier member to the first barrier member via an adhesive includes attaching the second barrier member to the first barrier member via a hot melt adhesive.

Clause 20: The method of Clause 1, wherein forming the first barrier member from the first material includes applying heat and a vacuum to a sheet of the first material.

Clause 21: The method of Clause 1, wherein forming the first barrier member from the first material includes compression molding a sheet of the first material within a die.

Clause 22: The method of Clause 1, wherein providing the first compartment with the first quantity of particulate matter and providing the second compartment with the second quantity of particulate matter includes injecting the first quantity of particulate matter between the first barrier member and the second barrier member at a first port in fluid communication with the first compartment and includes injecting the second quantity of particulate matter between the first barrier member and the second barrier member at a second port in fluid communication with the second compartment.

Clause 23: The method of Clause 22, further comprising sealing the first port and the second port after injection of the first quantity of particulate matter into the first compartment and after injection of the second quantity of particulate matter into the second compartment.

Clause 24: The method of Clause 23, wherein sealing the first port and the second port includes attaching the first barrier member to the second barrier member using radio frequency (RF) welding.

Clause 25: A method of making a sole structure for an article of footwear comprising providing a midsole with a first cavity and a second cavity, forming a first barrier member from a first material, the first barrier member including a first compartment and a second compartment, forming a second barrier member from a second material, providing the first compartment with a first quantity of particulate matter, providing the second compartment with a second quantity of particulate matter, covering the first compartment with the second barrier member, covering the second compartment with the second barrier member, positioning the first compartment within the first cavity, and positioning the second compartment within the second cavity.

Clause 26: The method of Clause 25, wherein forming the first barrier member from the first material includes forming the first barrier member from a different material than the second material.

Clause 27: The method of Clause 25, wherein forming the first barrier member includes forming a sheet of the first material into a shape defining the first compartment and the second compartment.

Clause 28: The method of any of the preceding clauses, wherein forming the first barrier member from the first material includes forming the first barrier member from a polymer.

Clause 29: The method of any of the preceding clauses, wherein forming the first barrier member from the first material includes forming the first barrier member from thermoplastic polyurethane (TPU).

Clause 30: The method of any of the preceding clauses, wherein forming the second barrier member from the second material includes forming the second barrier member from spandex.

Clause 31: The method of Clause 25, wherein providing the first compartment with the first quantity of particulate matter includes providing the first compartment with a quantity of particulate matter that is approximately the same as the second quantity of particulate matter.

Clause 32: The method of Clause 25, wherein providing the first compartment with the first quantity of particulate matter includes providing the first compartment with a quantity of particulate matter that is different than the second quantity of particulate matter.

Clause 33: The method of any of the preceding clauses, wherein providing the first compartment with the first quantity of particulate matter and providing the second compartment with the second quantity of particulate matter includes providing the first compartment and the second compartment with foam beads.

Clause 34: The method of Clause 33, wherein providing the first compartment and the second compartment with foam beads includes providing foam beads having a substantially spherical shape.

Clause 35: The method of Clause 33, wherein providing the first compartment and the second compartment with foam beads includes providing foam beads having approximately the same size and shape.

Clause 36: The method of Clause 33, wherein providing the first compartment and the second compartment with foam beads includes providing foam beads having a different size and shape.

Clause 37: The method of Clause 25, wherein forming the first barrier member from the first material and forming the second barrier member from the second material includes forming one of the first barrier member and the second barrier member from a permeable material and forming the other of the first barrier member and the second barrier member from an impermeable material.

Clause 38: The method of Clause 25, wherein forming the first barrier member from the first material and forming the second barrier member from the second material includes forming the first barrier member from an impermeable material and forming the second barrier member from a permeable material.

Clause 39: The method of Clause 25, wherein providing the first compartment with the first quantity of particulate matter and providing the second compartment with the second quantity of particulate matter occurs before the first compartment and the second compartment are coved by the second barrier member.

Clause 40: The method of Clause 25, wherein providing the first compartment with the first quantity of particulate matter and providing the second compartment with the second quantity of particulate matter occurs after the first compartment and the second compartment are coved by the second barrier member.

Clause 41: The method of any of the preceding clauses, further comprising attaching the second barrier member to the first barrier member.

Clause 42: The method of Clause 41, wherein attaching the second barrier member to the first barrier member includes attaching the second barrier member to the first barrier member at a first attachment location that surrounds the first compartment and includes attaching the second barrier member to the first barrier member at a second attachment location that surrounds the second compartment.

Clause 43: The method of Clause 41, wherein attaching the second barrier member to the first barrier member includes attaching the second barrier member to the first barrier member via an adhesive.

Clause 44: The method of Clause 43, wherein attaching the second barrier member to the first barrier member via an adhesive includes attaching the second barrier member to the first barrier member via a hot melt adhesive.

Clause 45: The method of Clause 25, wherein forming the first barrier member from the first material includes applying heat and a vacuum to a sheet of the first material.

Clause 46: The method of Clause 25, wherein forming the first barrier member from the first material includes compression molding a sheet of the first material within a die.

Clause 47: The method of Clause 25, wherein providing the first compartment with the first quantity of particulate matter and providing the second compartment with the second quantity of particulate matter includes injecting the first quantity of particulate matter between the first barrier member and the second barrier member at a first port in fluid communication with the first compartment and includes injecting the second quantity of particulate matter between the first barrier member and the second barrier member at a second port in fluid communication with the second compartment.

Clause 48: The method of Clause 47, further comprising sealing the first port and the second port after injection of the first quantity of particulate matter into the first compartment and after injection of the second quantity of particulate matter into the second compartment.

Clause 49: The method of Clause 48, wherein sealing the first port and the second port includes attaching the first barrier member to the second barrier member using radio frequency (RF) welding.

Clause 50: The method of any of the preceding clauses, wherein providing the midsole includes forming the midsole from a foamed polymer material.

Clause 51: A method of making a sole structure for an article of footwear comprising providing an outsole; providing a midsole including a first cavity, a first aperture formed in a first surface of the midsole and in fluid communication with the first cavity, and a second aperture formed in a second surface of the midsole and in fluid communication with the first cavity, the second surface disposed on an opposite side of the midsole than the first surface and opposing the outsole; positioning a cushioning member including a first compartment containing a first quantity of particulate matter within the first cavity, the first quantity of particulate matter being visible through the second aperture at the outsole.

Clause 52: The method of Clause 51, wherein positioning the cushioning member within the first cavity includes positioning a cushioning member having a first barrier member and a second barrier member that cooperate to contain the first quantity of particulate matter within the first compartment.

Clause 53: The method of Clause 52, further comprising shaping the first barrier member to define the first compartment and attaching the second barrier member to the first barrier member.

Clause 54: The method of Clause 52, further comprising locating an adhesive between the first barrier member and the second barrier member.

Clause 55: The method of Clause 54, wherein locating the adhesive between the first barrier member and the second barrier member includes surrounding the first compartment with the adhesive.

Clause 56: The method of Clause 54, wherein locating the adhesive between the first barrier member and the second barrier member includes locating a hot melt adhesive.

Clause 57: The method of any of Clauses 52-56, further comprising tapering the first compartment in a direction away from the second barrier member.

Clause 58: The method of any of Clauses 52-57, further comprising covering the first compartment with the second barrier member to define a first interior void, the first quantity of particulate matter being disposed within the first interior void.

Clause 59: The method of any of any of Clauses 52-58, further comprising forming the first barrier member from a first material and forming the second barrier member from a second material different than the first material.

Clause 60: The method of Clause 59, wherein forming the first barrier member from a first material includes forming the first barrier member from a polymer.

Clause 61: The method of Clause 59, wherein forming the first barrier member from a first material includes forming the first barrier member from thermoplastic polyurethane (TPU).

Clause 62: The method of any of Clauses 59-61, wherein forming the second barrier member from a second material includes forming the second barrier member from spandex.

Clause 63: The method of Clause 59, wherein forming the first barrier member from a first material and forming the second barrier member from a second material includes forming one of the first material and the second material from a permeable material and the other of the first material and the second material from an impermeable material.

Clause 64: The method of Clause 59, wherein forming the first barrier member from a first material and forming the second barrier member from a second material includes forming the first material from an impermeable material and the second material from a permeable material.

Clause 65: The method of any of the preceding clauses, wherein positioning a cushioning member including a first compartment containing a first quantity of particulate matter includes positioning a cushioning member containing foam beads.

Clause 66: The method of Clause 65, wherein positioning a cushioning member containing foam beads includes providing foam beads having a substantially spherical shape.

Clause 67: The method of Clause 65, wherein positioning a cushioning member containing foam beads includes providing foam beads having approximately the same size and shape.

Clause 68: The method of Clause 65, wherein positioning a cushioning member containing foam beads includes providing foam beads having at least one of a different size and shape.

Clause 69: The method of Clause 51, further comprising forming the outsole from one of a transparent material and a translucent material, the first quantity of particulate matter being visible at the second aperture through the material of the outsole.

Clause 70: The method of any of the preceding clauses, further comprising providing the midsole with a second cavity, a third aperture formed in the first surface of the midsole and in fluid communication with the second cavity, and a fourth aperture formed in the second surface of the midsole and in fluid communication with the second cavity.

Clause 71: The method of Clause 70, further comprising providing the cushioning member with a second compartment that is received by the second cavity of the midsole and contains a second quantity of particulate matter, the second quantity of particulate matter being visible through the fourth aperture at the outsole.

Clause 72: The method of Clause 51, wherein positioning a cushioning member within the first cavity includes positioning an outer surface of the cushioning member substantially flush with the first surface of the midsole.

Clause 73: The method of Clause 51, wherein positioning a cushioning member within the first cavity includes extending an outer surface of the cushioning member from the first surface of the midsole to form at least one bulge.

Clause 74: The method of Clause 73, wherein forming at least one bulge includes forming the at least one bulge at the first compartment.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A sole structure for an article of footwear, the sole structure comprising:
    a midsole including a first cavity having a first edge extending between a first end disposed at a medial side of the midsole and a second end disposed at a lateral side of the midsole, a second edge spaced apart from the first edge and including a third end disposed at the medial side of the midsole and a fourth end disposed at the lateral side of the midsole, and an aperture extending through a bottom wall of the midsole and opposing an upper opening of the first cavity, the aperture smaller than the upper opening, the first end being spaced apart from the third end by a first distance and the second end being spaced apart from the fourth end by a second distance greater than the first distance, the first edge and the second edge being planar from the medial side to the lateral side; and
    a first quantity of particulate matter contained within the first cavity.

2. The sole structure of claim 1, further comprising a cushioning member including a first barrier member and a second barrier member cooperating to define a first compartment, the first compartment being received within the first cavity and containing the first quantity of particulate matter therein.

3. The sole structure of claim 1, wherein the first cavity includes a third edge extending along the medial side from the first end to the third end and a fourth edge extending along the lateral side from the second end to the fourth end.

4. The sole structure of claim 3, wherein at least one of the third edge and the fourth edge is arcuate.

5. The sole structure of claim 3, wherein the third edge defines a first convex surface opposing the medial side of the midsole and the fourth edge defines a second convex surface opposing the lateral side of the midsole.

6. The sole structure of claim 1, further comprising a second cavity disposed between the first cavity and a heel region of the midsole.

7. The sole structure of claim 6, wherein the second cavity receives a second quantity of particulate matter therein.

8. The sole structure of claim 1, wherein the first cavity is disposed in a forefoot region of the midsole.

9. The sole structure of claim 1, wherein the particulate matter includes foam beads.

10. An article of footwear incorporating the sole structure of claim 1.

11. A sole structure for an article of footwear, the sole structure comprising:
    a midsole including a first cavity having a first edge extending between a first end disposed at a medial side of the midsole and a second end disposed at a lateral side of the midsole, a second edge spaced apart from the first edge and including a third end disposed at the medial side of the midsole and a fourth end disposed at the lateral side of the midsole, and an aperture extending through a bottom wall of the midsole and opposing an upper opening of the first cavity, the aperture smaller than the upper opening, the first end being spaced apart from the third end by a first distance and the second end being spaced apart from the fourth end by a second distance less than the first distance, the first edge and the second edge being planar from the medial side to the lateral side; and
    a first quantity of particulate matter contained within the first cavity.

12. The sole structure of claim 11, further comprising a cushioning member including a first barrier member and a second barrier member cooperating to define a first compartment, the first compartment being received within the first cavity and containing the first quantity of particulate matter therein.

13. The sole structure of claim 11, wherein the first cavity includes a third edge extending along the medial side from the first end to the third end and a fourth edge extending along the lateral side from the second end to the fourth end.

14. The sole structure of claim 13, wherein at least one of the third edge and the fourth edge is arcuate.

15. The sole structure of claim 13, wherein the third edge includes a first convex surface opposing the lateral side of the midsole and the fourth edge includes a second convex surface opposing the lateral side of the midsole.

16. The sole structure of claim 11, further comprising a second cavity disposed between the first cavity and a heel region of the midsole.

17. The sole structure of claim 16, wherein the second cavity receives a second quantity of particulate matter therein.

18. The sole structure of claim 11, wherein the first cavity is disposed in a midfoot region of the midsole.

19. The sole structure of claim 11, wherein the particulate matter includes foam beads.

20. An article of footwear incorporating the sole structure of claim 11.

* * * * *